United States Patent
Kinouchi et al.

(10) Patent No.: US 12,443,215 B2
(45) Date of Patent: Oct. 14, 2025

(54) ACCELERATOR DEVICE

(71) Applicant: DENSO CORPORATION, Kariya (JP)

(72) Inventors: Soichi Kinouchi, Kariya (JP); Yuusuke Yoshida, Kariya (JP); Tetsuji Yamanaka, Kariya (JP); Takuto Kita, Kariya (JP); Yuta Fujinaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/664,599

(22) Filed: May 15, 2024

(65) Prior Publication Data

US 2024/0295895 A1  Sep. 5, 2024

Related U.S. Application Data

(63) Continuation of application No. PCT/JP2022/042543, filed on Nov. 16, 2022.

(30) Foreign Application Priority Data

Nov. 19, 2021  (JP) .................. 2021-188676

(51) Int. Cl.
  *G05G 1/44*  (2008.04)
  *B60K 26/02*  (2006.01)
  *G05G 5/05*  (2006.01)

(52) U.S. Cl.
  CPC ............... *G05G 1/44* (2013.01); *B60K 26/02* (2013.01); *G05G 5/05* (2013.01)

(58) Field of Classification Search
  None
  See application file for complete search history.

(56) References Cited

U.S. PATENT DOCUMENTS

| 10,921,843 B2 * | 2/2021 | Nagashima ............ B60K 26/02 |
| 2013/0091977 A1 * | 4/2013 | Fukushima ............... G05G 5/03 74/513 |
| 2013/0152725 A1 | 6/2013 | Maruyama |
| 2014/0251069 A1 | 9/2014 | Maruyama |

* cited by examiner

*Primary Examiner* — Vicky A Johnson
(74) *Attorney, Agent, or Firm* — Nixon & Vanderhye P.C.

(57) ABSTRACT

An accelerator device includes a pedal lever, a power transmission mechanism, and a control unit. The pedal lever is movable in response to a pedal depression operation, and is biased in a return direction by a pedal biasing member. The power transmission mechanism includes an actuator lever that is contactable with the pedal lever and is biased in the return direction of the pedal lever by an actuator lever biasing member, and is capable of applying a reaction force to the pedal lever, which is a force in the return direction by a driving force of a drive source via the actuator lever. The control unit controls energization of the drive source, and performs a brake control in which a return speed of the actuator lever is reduced when the pedal lever returns to a fully closed direction.

14 Claims, 24 Drawing Sheets

ACCELERATOR DEVICE

CROSS REFERENCE TO RELATED APPLICATION

The present application is a continuation application of International Patent Application No. PCT/JP2022/042543 filed on Nov. 16, 2022, which designated the U.S. and claims the benefit of priority from Japanese Patent Application No. 2021-188676 filed on Nov. 19, 2021. The entire disclosures of all of the above applications are incorporated herein by reference.

TECHNICAL FIELD

The present disclosure relates to an accelerator device.

BACKGROUND

Conventionally, an accelerator device that can apply a reaction force to an accelerator pedal from an actuator is known. For example, an additional spring is used to always keep a motor-side arm in constant contact with a pedal-side arm. When a return speed of the pedal-side arm is higher than a return speed of the motor-side arm in a non-energized state, the motor-side arm collides with the pedal-side arm due to a follow-up delay, and thereby an impact force, vibration, noise, and the like may be generated.

SUMMARY

An accelerator device according to an aspect of the present disclosure includes a pedal lever, a power transmission mechanism, and a control unit. The pedal lever is movable in response to a depression operation and is biased in a return direction by a pedal biasing member. The power transmission mechanism includes an actuator lever that is contactable with the pedal lever and is biased in the return direction of the pedal lever by an actuator lever biasing member. The power transmission mechanism may be configured to be capable of applying a reaction force, which is a force in the return direction by a driving force of a drive source via the actuator lever, to the pedal lever.

The control unit may be configured to control energization of the drive source. In this case, the control unit performs a brake control in which a return speed of the actuator lever is reduced, when the pedal lever returns to a fully closed direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
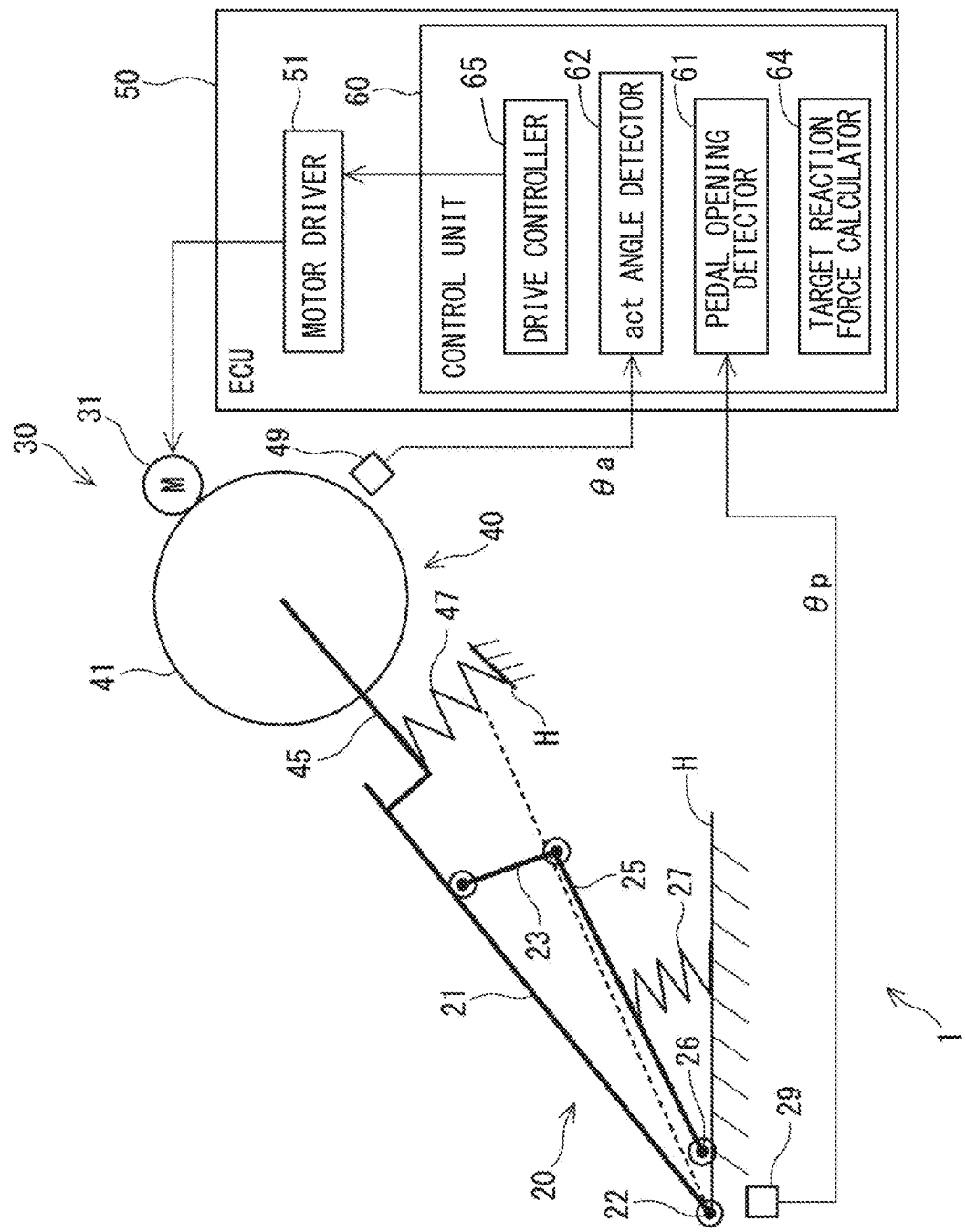
FIG. 1 is a schematic diagram showing an accelerator device according to a first embodiment.

For example, an accelerator device that can apply a reaction force to an accelerator pedal from an actuator is known. In this case, an additional spring may be used to always keep a motor-side arm in constant contact with a pedal-side arm. In this accelerator device, when a return speed of the pedal-side arm is higher than a return speed of the motor-side arm in a non-energized state, the motor-side arm collides with the pedal-side arm due to a follow-up delay, and thereby an impact force, vibration, noise, and the like may be generated. Further, if a spring force of the additional spring is increased in order to prevent the follow-up delay of the motor-side arm, basic pedal force characteristics of the pedal will be greatly affected, and there is a possibility that a pedal depression will become heavier.

It is an object of the present disclosure to provide an accelerator device that is capable of reducing an impact caused by a collision between a pedal lever and an actuator lever when the pedal lever returns.

An accelerator device according to an exemplar of the present disclosure includes a pedal lever, a power transmission mechanism, and a control unit. The pedal lever is movable in response to a depression operation and is biased in a return direction by a pedal biasing member. The power transmission mechanism includes an actuator lever that is contactable with the pedal lever and is biased in the return direction of the pedal lever by an actuator lever biasing member. The power transmission mechanism is configured to be capable of applying a reaction force, which is a force in the return direction by a driving force of a drive source via the actuator lever, to the pedal lever.

The control unit is configured to control energization of the drive source. In addition, the control unit performs a brake control in which a return speed of the actuator lever is reduced, when the pedal lever returns to a fully closed direction. In such manner, an impact caused by a collision between the pedal lever and the actuator lever can be reduced when the pedal lever returns.

Hereinafter, an accelerator device according to the present disclosure will be described with reference to the drawings. In the following plural embodiments, substantially same structural configurations are designated with the same reference numerals thereby to simplify the description.

First Embodiment

The first embodiment is shown in FIGS. 1 to 11. As shown in FIG. 1, an accelerator device 1 includes a pedal lever 20, a motor 31, a power transmission mechanism 40, an ECU 50, and the like.

The pedal lever 20 includes a pad 21, an arm 23, and a pedal 25, and those components are driven integrally by a driver's depression operation or the like. The pad 21 is provided to be movable by a driver's depression operation. The pad 21 is rotatably supported by a fulcrum member 22 provided in a housing H. FIG. 1 illustrates a so-called floor type (organ type) pedal in which the pad 21 is provided to extend in a direction along one surface of the housing H. However, a suspension type (pendant type) pedal may also be used. In the present embodiment, a casing such as a pedal housing and a motor housing that are not driven by the drive of the motor 31 and the depression operation of the pedal lever 20 are collectively referred to as a "housing H."

The arm 23 connects the pad 21 and the pedal 25. One end of the pedal 25 is rotatably supported by the housing H by a fulcrum member 26, and the other end is connected to the arm 23. As a result, the pad 21, the arm 23, and the pedal 25 are driven together by the driver's operation of the pad 21. A pedal opening sensor 29 is provided at one end of the pedal 25 to detect a pedal opening degree.

A pedal biasing member 27 is a compression coil spring, and has one end fixed to the pedal 25 and the other end fixed to the housing H, and biases the pedal 25 in an accelerator closing direction. In FIG. 1 and the like, a position of the pad 21 when the accelerator is fully open and when the accelerator is fully closed is appropriately indicated by a broken line.

The motor 31 is, for example, a brushed DC motor. The driving force of the motor 31 is transmitted to the pedal lever 20 via the power transmission mechanism 40. Here, an actuator 30 is a series of components that transmit the driving force from the motor 31, which is a drive source, to the pedal lever 20 via the power transmission mechanism 40.

The power transmission mechanism 40 includes a gear set 41, an actuator lever 45, an actuator lever biasing member 47, and the like. The gear set 41 includes a motor gear that rotates together with a motor shaft and a plurality of gears that engage with the motor gear, and transmits the driving force of the motor 31 to the actuator lever 45. One of the gears constituting the gear set 41 is provided with a position sensor 49 that detects a rotation position.

The actuator lever 45 has one end connected to the gear set 41 and the other end being in contact with the pedal lever 20. Thereby, the driving force of the motor 31 is transmitted to the pedal lever 20 via the power transmission mechanism 40. In FIG. 1, the other end of the actuator lever 45 is in contact with the pad 21, but it may be configured to be in contact with the arm 23 or the pedal 25. The actuator lever biasing member 47 is a compression coil spring, and biases the actuator lever 45 in a reaction force applying direction.

Figure 2:
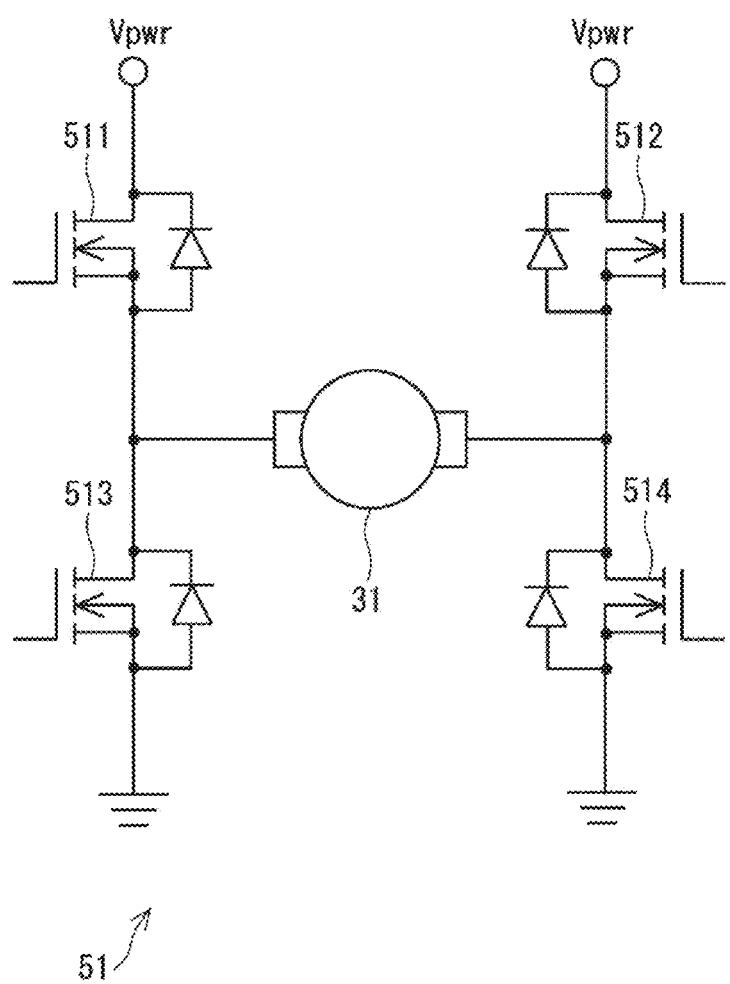
FIG. 2 is a circuit diagram showing a motor driver according to the first embodiment.

The ECU 50 includes a motor driver 51, a control unit 60, and the like. As shown in FIG. 2, the motor driver 51 is an H-bridge circuit having switching elements 511 to 514 for switching energization to the motor 31. In FIG. 2 and the like, a terminal on a power supply side is designated as Vpwr.

Returning to FIG. 1, the control unit 60 is mainly composed of a microcomputer, and internally includes a CPU, a ROM, a RAM, an I/O, and a bus line connecting these components, none of which are shown. Each process in the control unit 60 may be a software process in which a CPU executes a program stored in a physical memory device such as a ROM (i.e., a readable, non-transitory, tangible recording medium), or it may also be a hardware process using a dedicated electronic circuit. Further, although function blocks are shown as being configured by one control unit 60 in FIG. 1, some functions may be configured by another ECU.

The control unit 60 includes a pedal opening detector 61, an actuator angle detector 62, a target reaction force calculator 64, a drive controller 65, and the like as function blocks. The pedal opening detector 61 detects a pedal angle θp, which is a rotation angle of the pedal lever 20 from a fully closed position, based on a detected value of the pedal opening sensor 29. The detected value of the pedal opening sensor 29 may be configured to be acquired directly from the pedal opening sensor 29, or may be configured to be acquired from another ECU (not shown) through communication or the like.

The actuator angle detector 62 detects an actuator angle θa based on the detected value of the position sensor 49. The actuator angle θa is a rotation angle of the actuator lever 45 with reference to a state in which the pedal lever 20 is in the fully closed position and the actuator lever 45 is in contact with the pedal lever 20. In the present embodiment, the actuator angle θa is a value converted by a gear ratio or the like to correspond to the pedal angle θp.

The target reaction force calculator 64 calculates a target reaction force to be applied to the pedal lever 20. The drive controller 65 generates a control signal for controlling an on/off operation of the switching elements 511 to 514 based on the target reaction force, and the like, and controls the drive of the motor 31 by controlling the on/off operation of the switching elements 511 to 514.

FIG. 1 shows an initial state in which the pedal lever 20 is not depressed and the motor 31 is not energized. In the initial state, the pedal lever 20 is in the fully closed position due to a biasing force of the pedal biasing member 27. The actuator lever 45 is in contact with the pad 21 due to the biasing force of the actuator lever biasing member 47.

Figure 3:
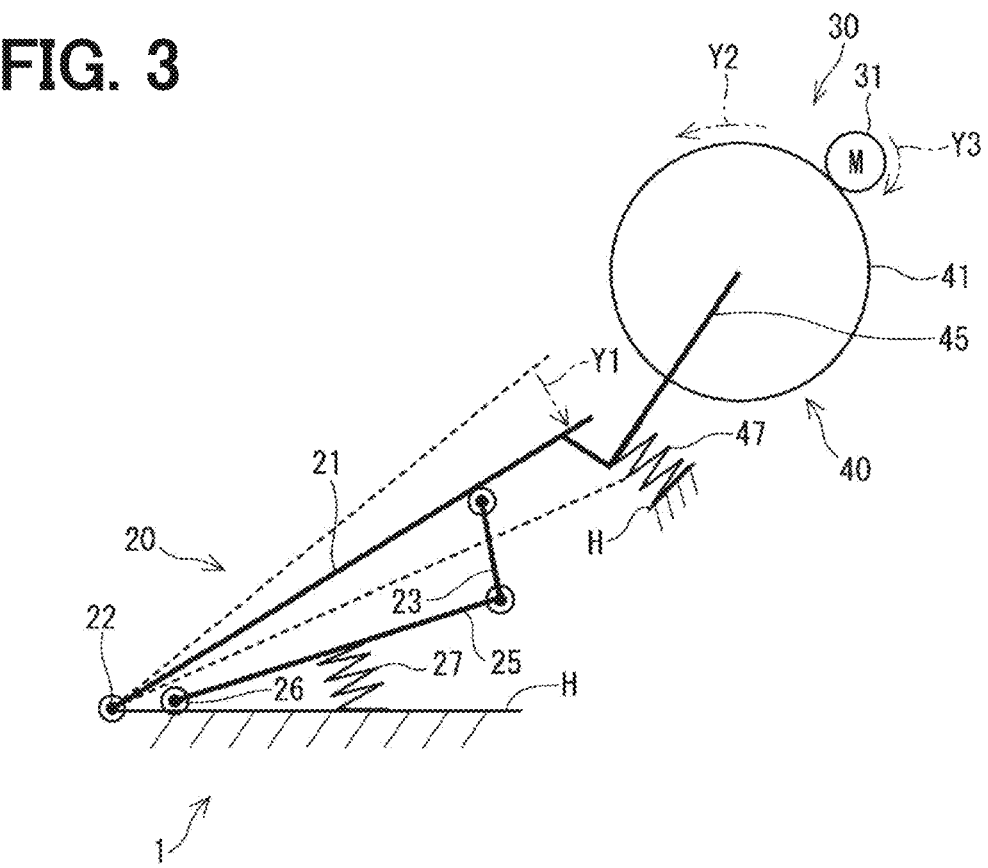
FIG. 3 is a schematic diagram showing a state in which a pedal lever is depressed in the accelerator device according to the first embodiment.

FIG. 3 shows a state in which the motor 31 is not energized and the pedal lever 20 is depressed by the driver. As shown by an arrow Y1, when the pedal lever 20 is depressed in a non-energized state, the gear set 41 is rotated by the actuator lever 45 as shown by an arrow Y2, and as a result, as shown by an arrow Y3, the motor 31 rotates together.

When the motor 31 is not energized, an energization circuit is kept in an open state. When the energization circuit is brought into an open state, the motor driver 51 may either (1) turn off all the switching elements 511 to 514, (2) turn off any three of the switching elements 511 to 514, (3) turn off the switching elements 511 and 513, and turn on the switching elements 512 and 514, or (4) turn on the switching elements 511 and 513, and turn off the switching elements 512 and 514.

Figure 4:
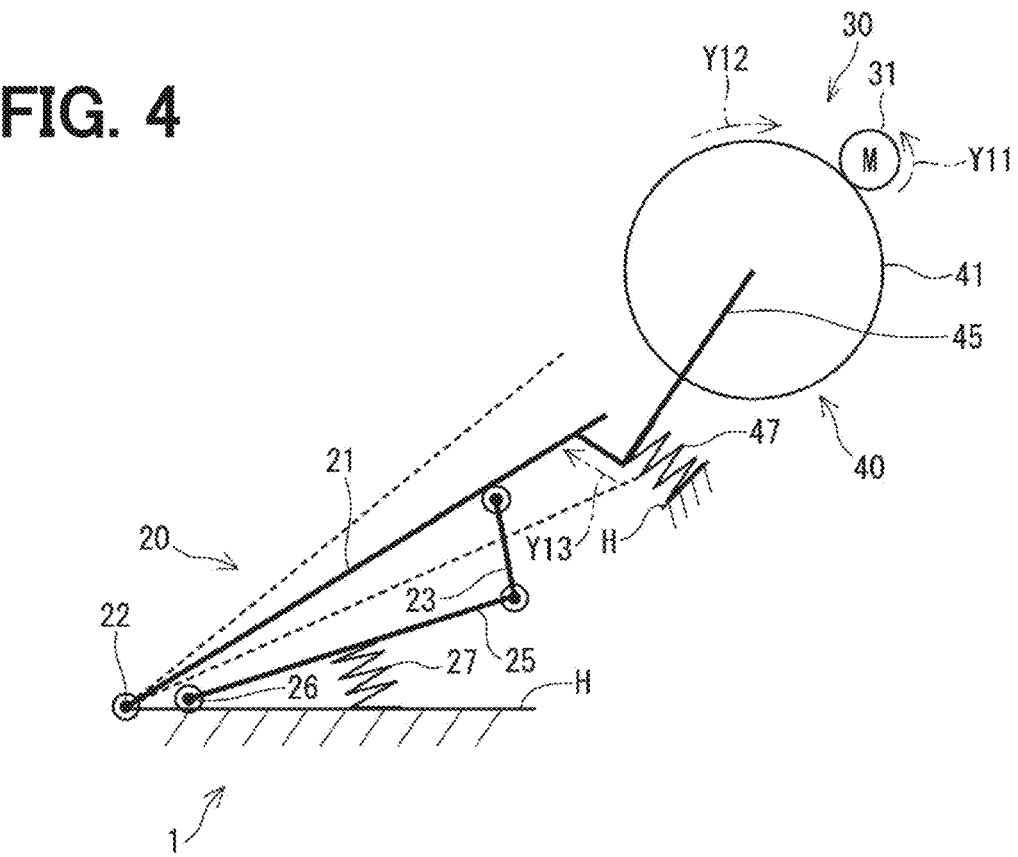
FIG. 4 is a schematic diagram showing a state in which a reaction force is applied in the accelerator device according to the first embodiment.

FIG. 4 shows a state in which a reaction force is applied at an intermediate position where the pedal lever 20 is depressed. When the motor 31 rotates in the reaction force applying direction by energizing the motor 31 as shown by an arrow Y11, the gear set 41 rotates as shown by an arrow Y12. As a result, a reaction force is applied to the pedal lever 20 via the actuator lever 45, as shown by an arrow Y13.

Figure 5:
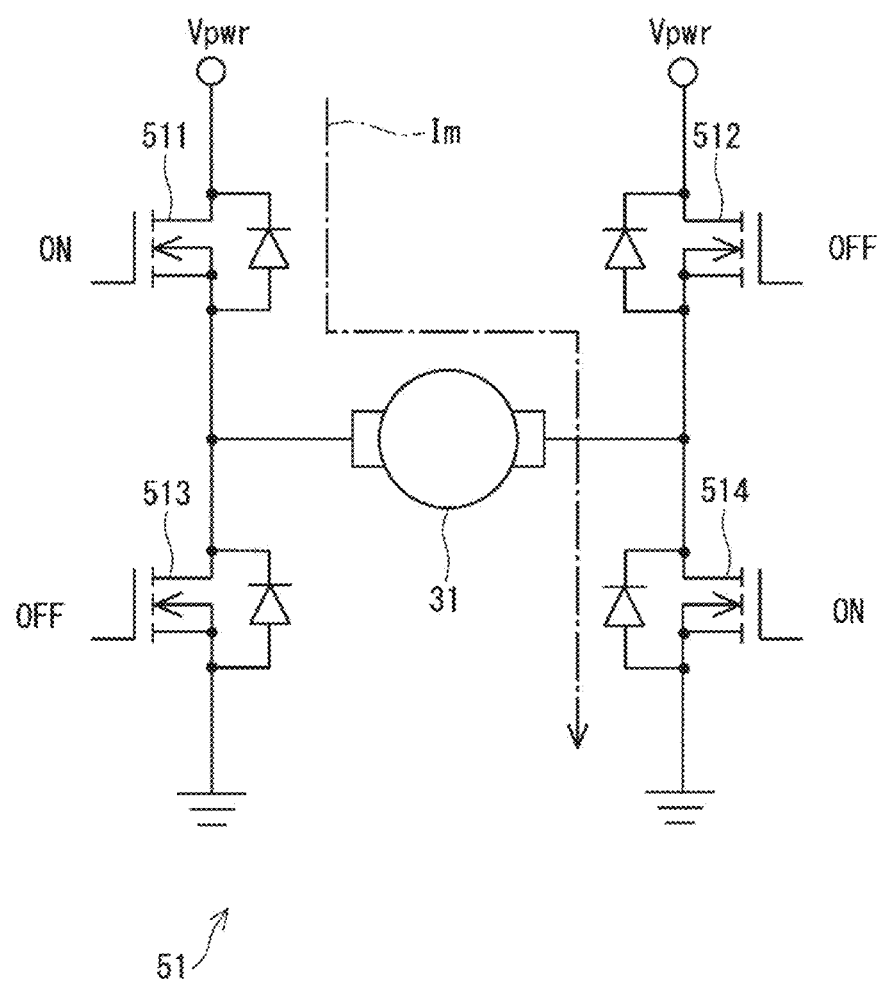
FIG. 5 is a circuit diagram showing an energization state when applying the reaction force in the accelerator device according to the first embodiment.

As shown in FIG. 5, when driving the motor 31 in the reaction force applying direction, a motor current Im flows by turning on the switching elements 511 and 514 and turning off the switching elements 512 and 513. In the present embodiment, a rotation direction and an energization direction of the motor 31 when applying the reaction force are considered as positive.

Figure 6:
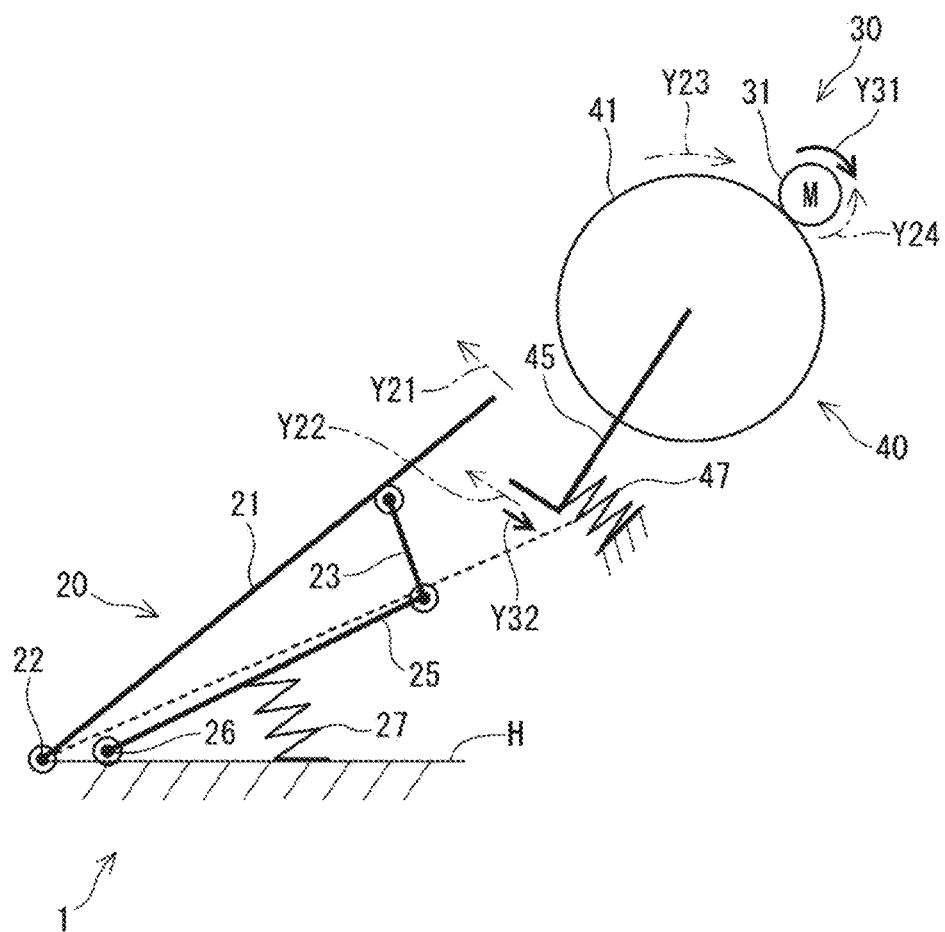
FIG. 6 is a schematic diagram showing a state in which the pedal lever returns to a fully closed direction in the accelerator device according to the first embodiment.

FIG. 6 shows a state in which the pedal lever 20 returns to the fully closed direction from the state in FIG. 3 in which the motor 31 is not energized. When the application of the pedal force to the pedal lever 20 is released, the pedal lever 20 is returned to the fully closed direction by the biasing force of the pedal biasing member 27, as shown by an arrow Y21. Further, when the actuator lever 45 is driven toward the fully closed side by the biasing force of the actuator lever biasing member 47 as shown by an arrow Y22, the gear set 41 rotates as shown by an arrow Y23. This causes the motor 31 to rotate together as shown by an arrow Y24.

Here, if a return speed of the pedal lever 20 is higher than a return speed of the actuator lever 45, when the actuator lever 45 separates from the pedal lever 20 due to the follow-up delay and then comes into contact with the pedal lever 20 again, there is a risk of generating the impact force, vibration, or noise, due to a collision. Hereinafter, vibration and noise will be collectively referred to as "NV." In order to avoid such a situation, if the spring force of the actuator lever biasing member 47 is increased, the basic pedal force characteristics of the pedal lever 20 will be greatly affected, and there is a possibility that normal pedal depression will become heavier.

Therefore, in the present embodiment, when the pedal lever 20 returns, the return speed of the actuator lever 45 is reduced by performing the brake control on the motor 31, as shown by an arrow Y31. That is, when the actuator lever 45 is going to return to the fully closed direction due to the biasing force of the actuator lever biasing member 47 (the arrow Y22), by driving the motor 31 in an opposite direction opposite to the reaction force applying direction (an arrow Y32), a counter force is applied to counter the biasing force in a depression direction of the actuator lever 45, thereby reducing the return speed at which the actuator lever 45 returns to the fully closed direction. In such manner, the impact force when the pedal lever 20 and the actuator lever 45 come into contact is mitigated without increasing a load on the actuator lever biasing member 47.

Figure 7:
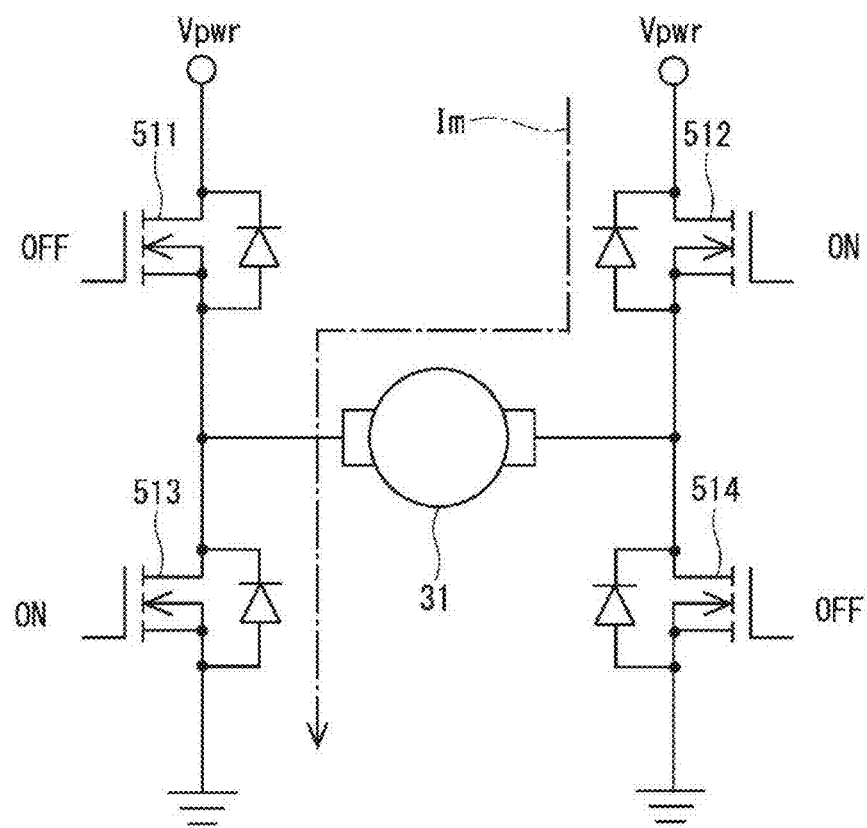
FIG. 7 is a circuit diagram showing an energization state during brake control according to the first embodiment.

As shown in FIG. 7, in the brake control, the switching elements 512 and 513 are turned on and the switching elements 511 and 514 are turned off, thereby the energization direction is made opposite to the one in a reaction force applying situation, i.e., an energization torque is applied in the depression direction of the pedal lever 20. In such manner, a relatively large braking force is generated.

Figure 8:
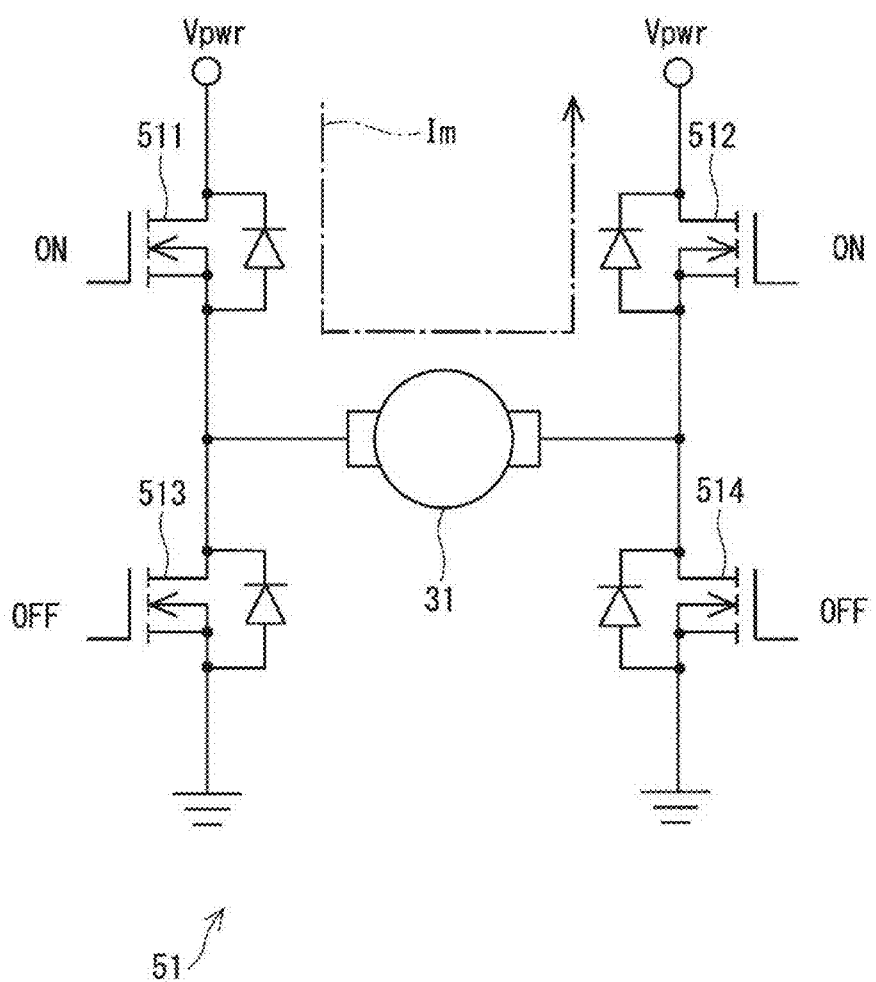
FIG. 8 is another circuit diagram showing an energization state during brake control according to the first embodiment.
Figure 9:
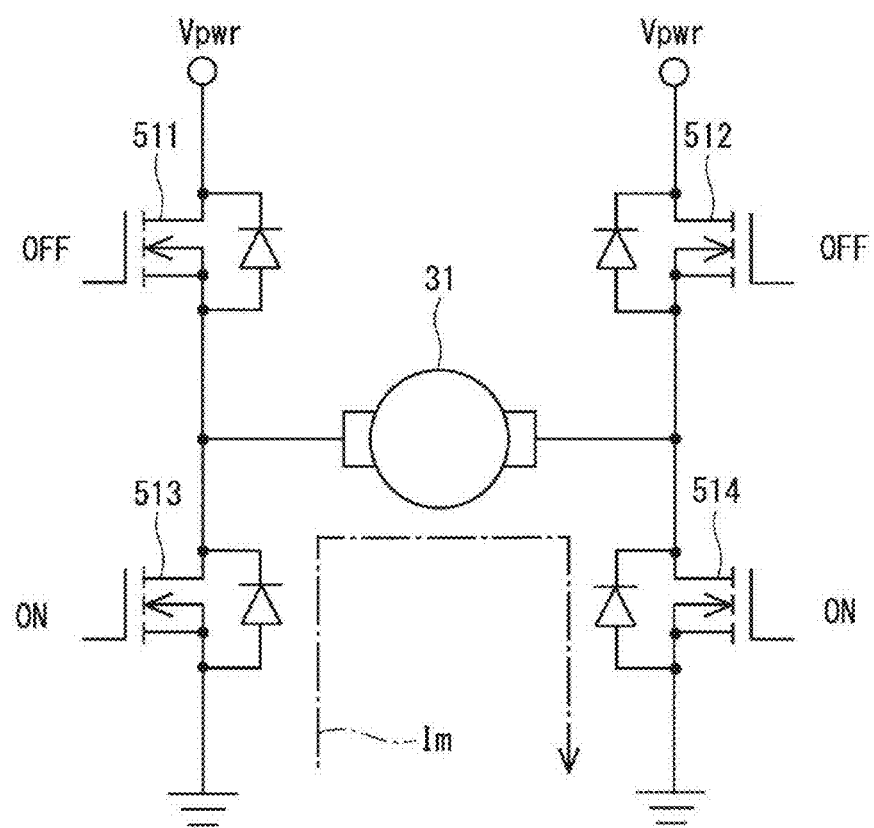
FIG. 9 is yet another circuit diagram showing an energization state during brake control according to the first embodiment.

Further, as shown in FIG. 8, the switching elements 511 and 512 are turned on and the switching elements 513 and 514 are turned off to put the energization circuit in a closed state. As shown in FIG. 9, the energization circuit may be put in a closed state by turning on the switching elements 513 and 514 and turning off the switching elements 511 and 512. By putting the energization circuit in a closed state, the brake control is performed by generating a resistance torque in the depression direction through regeneration. By performing the brake control using regeneration, consumption of electric power in the brake control is reducible.

Figure 10:
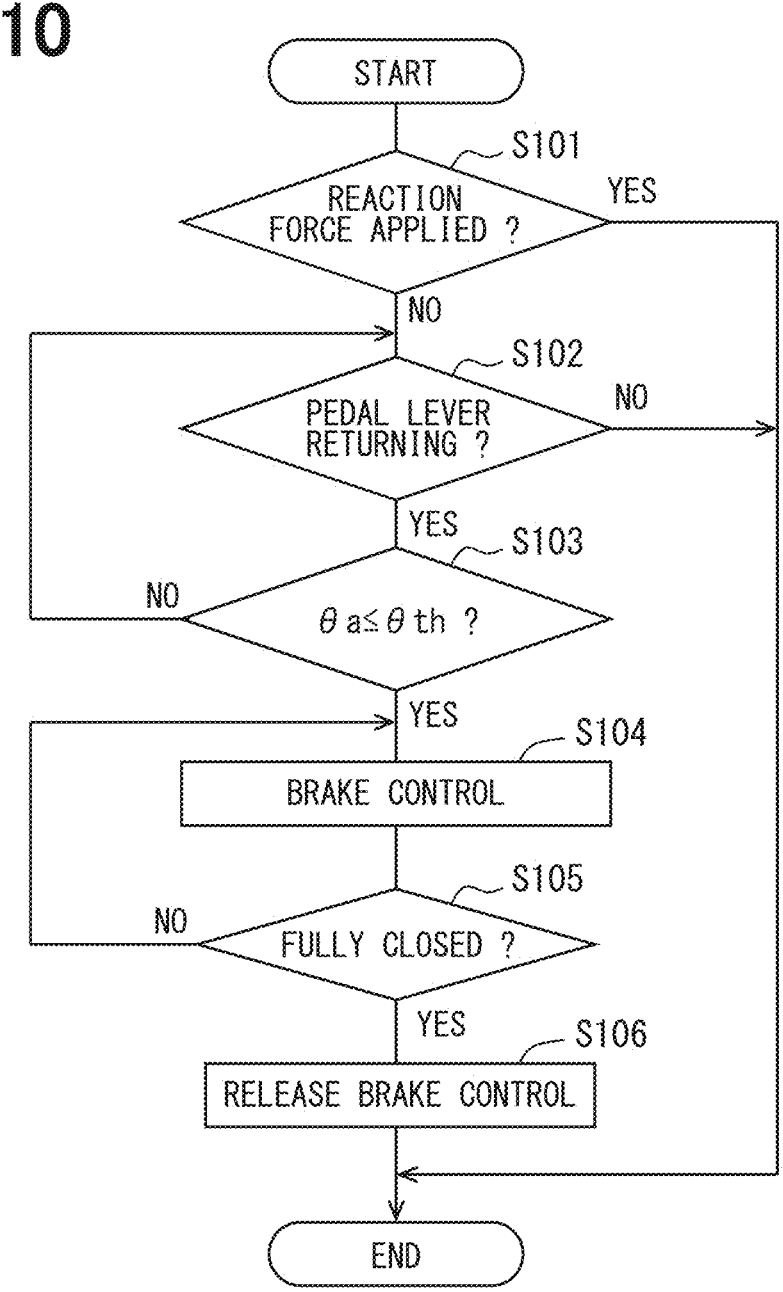
FIG. 10 is a flowchart illustrating a brake control according to the first embodiment.

The brake control of the present embodiment will be explained based on a flowchart of FIG. 10. This process is performed by the control unit 60 at a predetermined cycle. Hereinafter, "step" in step S101 and the like is omitted, and is simply referred to by a symbol "S."

In S101, the control unit 60 determines whether a reaction force application control is being performed. If it is determined that the reaction force application control is being performed (S101: YES), the processes from S102 onwards are skipped. If it is determined that the reaction force application control is not being performed (S101: NO), the process shifts to S102.

In S102, the control unit 60 determines whether it is time for the pedal lever 20 to return. If it is determined that it is not time to return the pedal lever 20 (S102: NO), the processes from S103 onward are skipped. If it is determined that it is time to return the pedal lever 20 (S102: YES), the process shifts to S103.

In S103, the control unit 60 determines whether the actuator angle θa is less than or equal to an angle determination threshold value θth. Although a case is shown in which the determination is made based on the actuator angle θa, the pedal angle θp may also be used instead of the actuator angle θa. The same applies to S105. By using the actuator angle θa, the determination can be made with relatively good responsiveness. Furthermore, by using the pedal angle θp, a returned state of the pedal lever 20 is reliably detectable. The angle determination threshold value θth is set according to an angle at which the brake control is started. If it is determined that the actuator angle θa is greater than the angle determination threshold value θth (S103: NO), the process returns to S102. If it is determined that the actuator angle θa is less than or equal to the angle determination threshold value θth (S103: YES), the process shifts to S104, and the brake control is performed. The brake control may be performed in any of the energization states shown in FIGS. 7 to 9.

In S105, the control unit 60 determines whether the actuator lever 45 has returned to the fully closed position. If it is determined that the actuator lever 45 has not returned to the fully closed position (S105: NO), the process returns to S104, and the brake control is continued. If it is determined that the actuator lever 45 has returned to the fully closed position (S105: YES), the process shifts to S106, the switching elements 511 to 514 are turned off, and the brake control is released.

Figure 11:
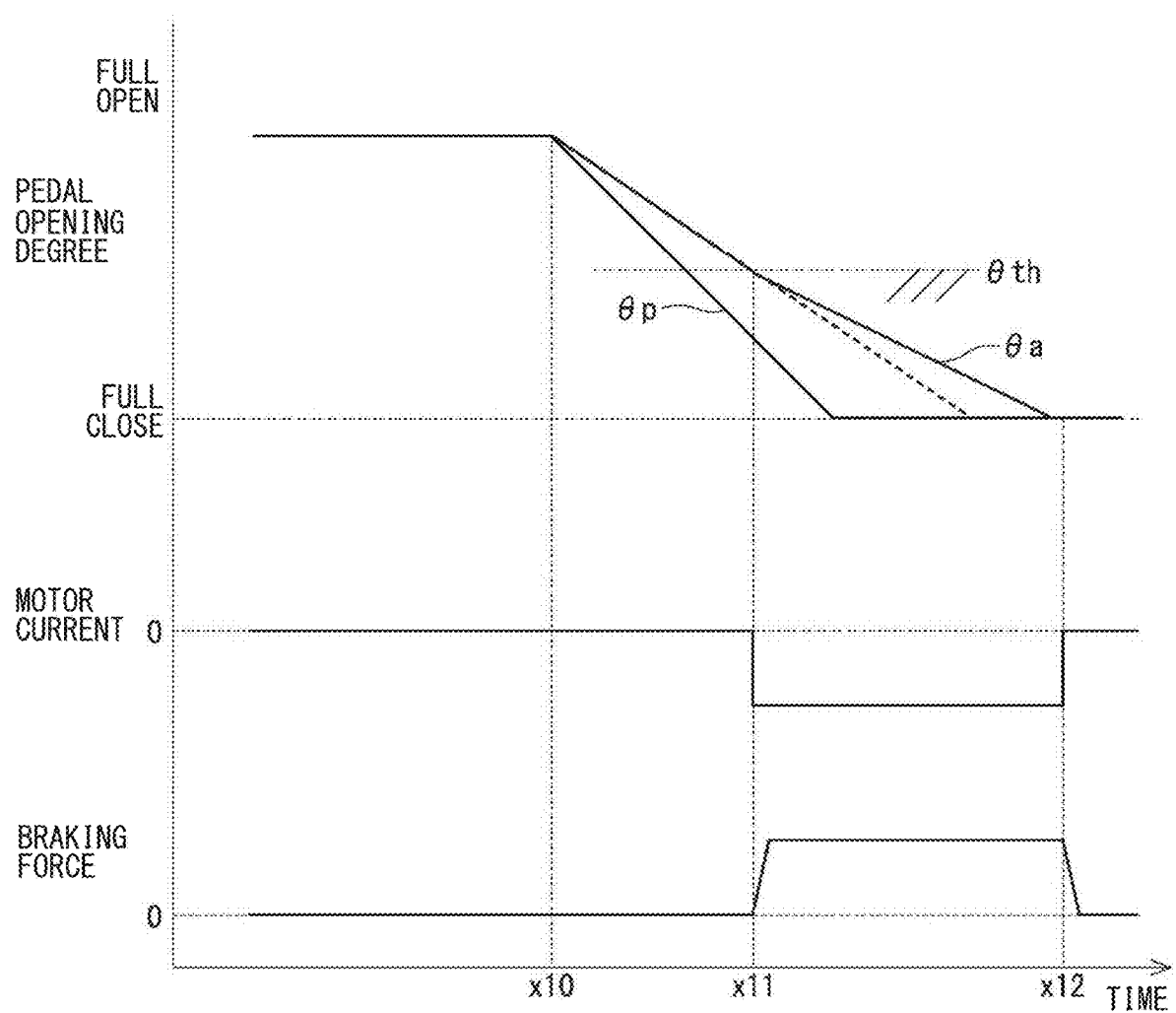
FIG. 11 is a time chart illustrating a brake control according to the first embodiment.

The brake control of the present embodiment will be explained based on a time chart of FIG. 11. In FIG. 11, the horizontal axis is used as a common time axis, and a pedal opening degree, a motor current, and a braking force are shown from the top row. The same applies to FIGS. 13 and 17.

Before time x10, a constant pedal opening degree is maintained in a state where no reaction force is applied by energizing the motor 31. When the pedal lever 20 starts to return at time x10, the pedal lever 20 returns first, the actuator lever 45 follows behind, and the pedal lever 20 and the actuator lever 45 are separated.

At time x11, when the actuator angle θa becomes equal to or less than the angle determination threshold value θth, the brake control is performed. Here, as shown in FIG. 7, it is assumed that the energization is performed in the opposite direction to that when the reaction force is applied. When the braking force is generated by the brake control, the return speed of the actuator lever 45 lowers than that when no brake control is performed as shown by a broken line.

At time x12, when the actuator lever 45 returns to the fully closed position, the energization to the motor 31 is turned off and the brake control ends. When the actuator lever 45 returns to the fully closed position and contacts the pedal lever 20, the return speed of the actuator lever 45 is already suppressed, thereby the impact and NV are mitigable.

As explained above, the accelerator device 1 includes the pedal lever 20, the power transmission mechanism 40, and the control unit 60. The pedal lever 20 is movable in response to a depression operation, and is biased in the return direction by the pedal biasing member 27. The power transmission mechanism 40 includes the actuator lever 45 that can come into contact with the pedal lever 20 and is biased in the return direction of the pedal lever 20 by the actuator lever biasing member 47, and is capable of applying a reaction force, which is a force, i.e., the driving force of the motor 31, in the return direction, to the pedal lever 20 via the actuator lever 45.

The control unit 60 controls energization of the motor 31. The control unit 60 performs the brake control so that the return speed of the actuator lever 45 is reduced when the pedal lever 20 returns to the fully closed direction. Thereby, it is possible to reduce the impact and NV caused by the collision between the pedal lever 20 and the actuator lever 45 when the pedal lever 20 returns.

The control unit 60 energizes the motor 31 in the opposite direction to that when applying the reaction force, as the brake control. Thereby, the return speed of the actuator lever 45 can be reliably reduced by a relatively large braking force.

As the brake control, the control unit 60 may generate regenerative braking force by closing the energization circuit related to the motor 31. Thereby, power consumption in the brake control is suppressible.

The control unit 60 determines whether to perform the brake control based on at least one of the pedal angle θp, which is the rotation angle of the pedal lever 20, or the actuator angle θa, which is the rotation angle of the actuator lever 45. Thereby, it is possible to appropriately determine whether to perform the brake control.

In the present embodiment, when the pedal angle θp or the actuator angle θa from the fully closed state of the pedal lever 20 becomes equal to or less than the angle determination threshold value θth, the brake control is performed. Thereby, whether to perform the brake control is determinable in a relatively simple manner. The control unit 60 performs the brake control when the pedal lever 20 returns in a state where no reaction force is being applied to the pedal lever 20. In other words, when a reaction force is being applied to the pedal lever 20, the pedal lever 20 and the actuator lever 45 are maintained in contact with each other, thereby no brake control is performed. Thus, the brake control is appropriately performable.

The control unit 60 releases the brake control when the pedal lever 20 or the actuator lever 45 returns to the fully closed position while the brake control is being performed. Thereby, the brake control is appropriately releasable. The pedal force characteristics return to normal by releasing the brake control, thereby it is possible to prevent an operational feeling of re-depression operation from deteriorating, i.e., when the pedal is depressed again.

Second Embodiment

Figure 12:
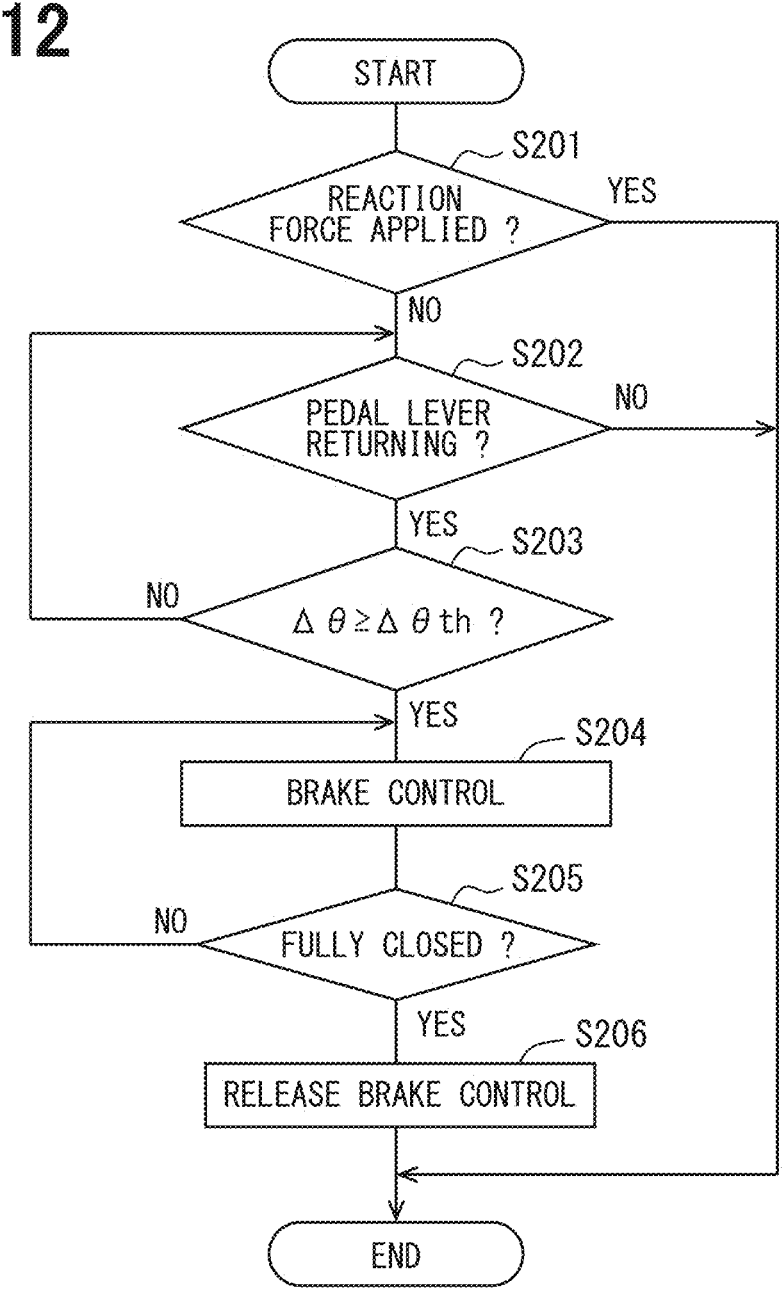
FIG. 12 is a flowchart illustrating a brake control according to a second embodiment.
Figure 13:
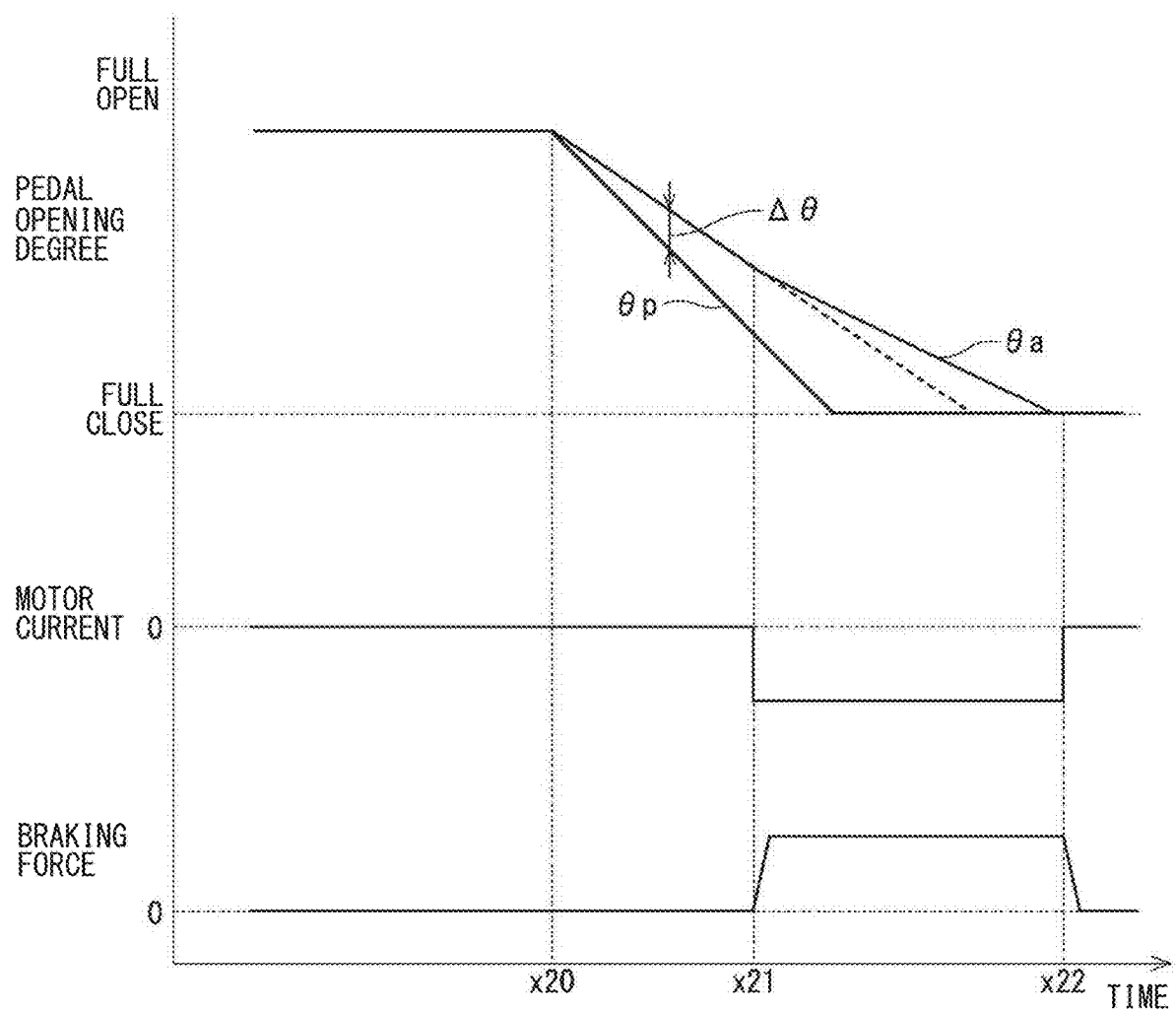
FIG. 13 is a time chart illustrating a brake control according to the second embodiment.

The second embodiment will be described based on FIGS. 12 and 13. Since the second embodiment and subsequent embodiments differ from the above-described embodiment in the brake control processing, this point will be mainly described. A brake control of the present embodiment will be explained based on the flowchart of FIG. 12. The processes in S201 and S202 are similar to the processes in S101 and S102 in FIG. 10.

In S203, to which the process proceeds when it is determined that a reaction force is not being applied and it is time for the pedal lever 20 to return (S201: NO, S202: YES), a control unit 60 determines whether an angular separation amount Δθ, which is a difference between a pedal angle θp and an actuator angle θa, is greater than or equal to a separation amount determination threshold value Δθth. The separation amount determination threshold value Δθth is set according to the impact, NV, and the like that occurs when the actuator lever 45 contacts the pedal lever 20. If it is determined that the angular separation amount Δθ is smaller than the separation amount determination threshold value Δθth (S203: NO), the process returns to S202. If it is determined that the angular separation amount Δθ is greater than or equal to the separation amount determination threshold value Δθth (S203: YES), the process shifts to S204. The processing from S204 to S206 is similar to the processing from S104 to S106 in FIG. 10.

The brake control of the present embodiment will be explained based on the time chart of FIG. 13. The time before time x20 is the same as the time before time x10 in FIG. 11. At time x20, the pedal lever 20 and the actuator lever 45 begin to return, and at time x21, when the angular separation amount Δθ becomes equal to or greater than the separation amount determination threshold value Δθth, the brake control is performed. The details of the brake control are the same as in FIG. 11. When the actuator lever 45 returns to the fully closed position at time x22, energization to the motor 31 is turned off and the brake control ends.

In the present embodiment, the control unit 60 performs the brake control when the angular separation amount Δθ, which is the difference between the pedal angle θp and the actuator angle θa, is greater than or equal to the separation amount determination threshold value Δθth. Thereby, whether to perform the brake control is determinable in a relatively simple manner. The present embodiment also provides the same effects as the above-described embodiment.

Third Embodiment

Figure 14:
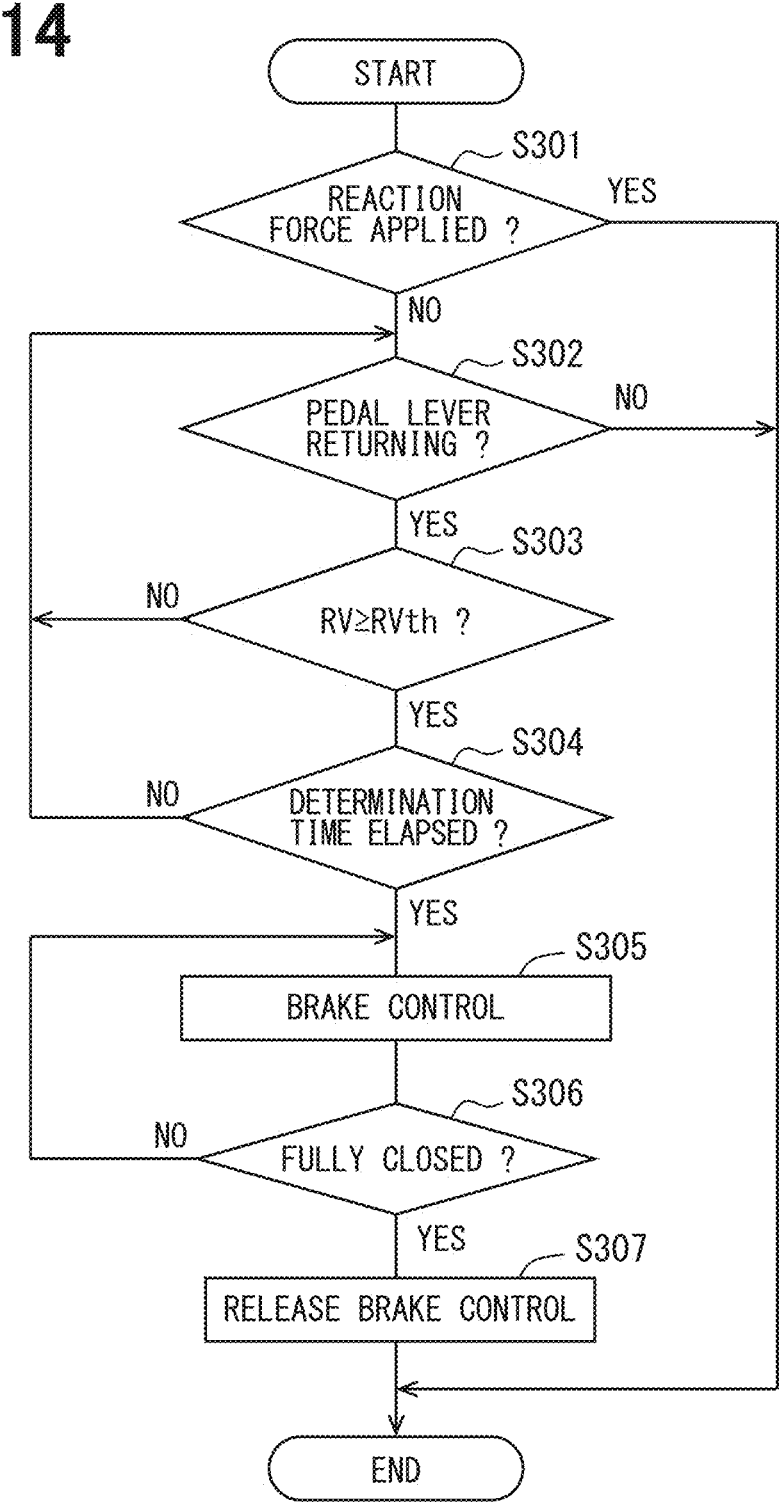
FIG. 14 is a flowchart illustrating a brake control according to a third embodiment.

A brake control process of the third embodiment will be explained based on the flowchart of FIG. 14. The processes in S301 and S302 are similar to the processes in S101 and S102 in FIG. 10.

In S303, the control unit 60 determines whether a relative speed RV, which is an angular speed ωp of the pedal lever 20 in the return direction with respect to an angular speed ωa of the actuator lever 45 in the return direction, is greater than or equal to a relative speed determination threshold value RVth. The relative speed determination threshold value RVth is set according to the impact, NV, and the like that occurs when the actuator lever 45 contacts the pedal lever 20. If it is determined that the relative speed RV is smaller than the relative speed determination threshold value RVth (S303: NO), the process returns to S302. If it is determined that the relative speed RV is greater than or equal to the relative speed determination threshold value RVth (S303: YES), the process shifts to S304.

In S304, the control unit 60 determines whether a determination time has elapsed since the relative speed RV became equal to or greater than the relative speed determination threshold value RVth. If it is determined that the determination time has not elapsed (S304: NO), the process returns to S302. If it is determined that the determination time has elapsed (S304: YES), the process shifts to S305. The processing from S305 to S307 is similar to the processing from S104 to S106 in FIG. 10.

Figure 15:
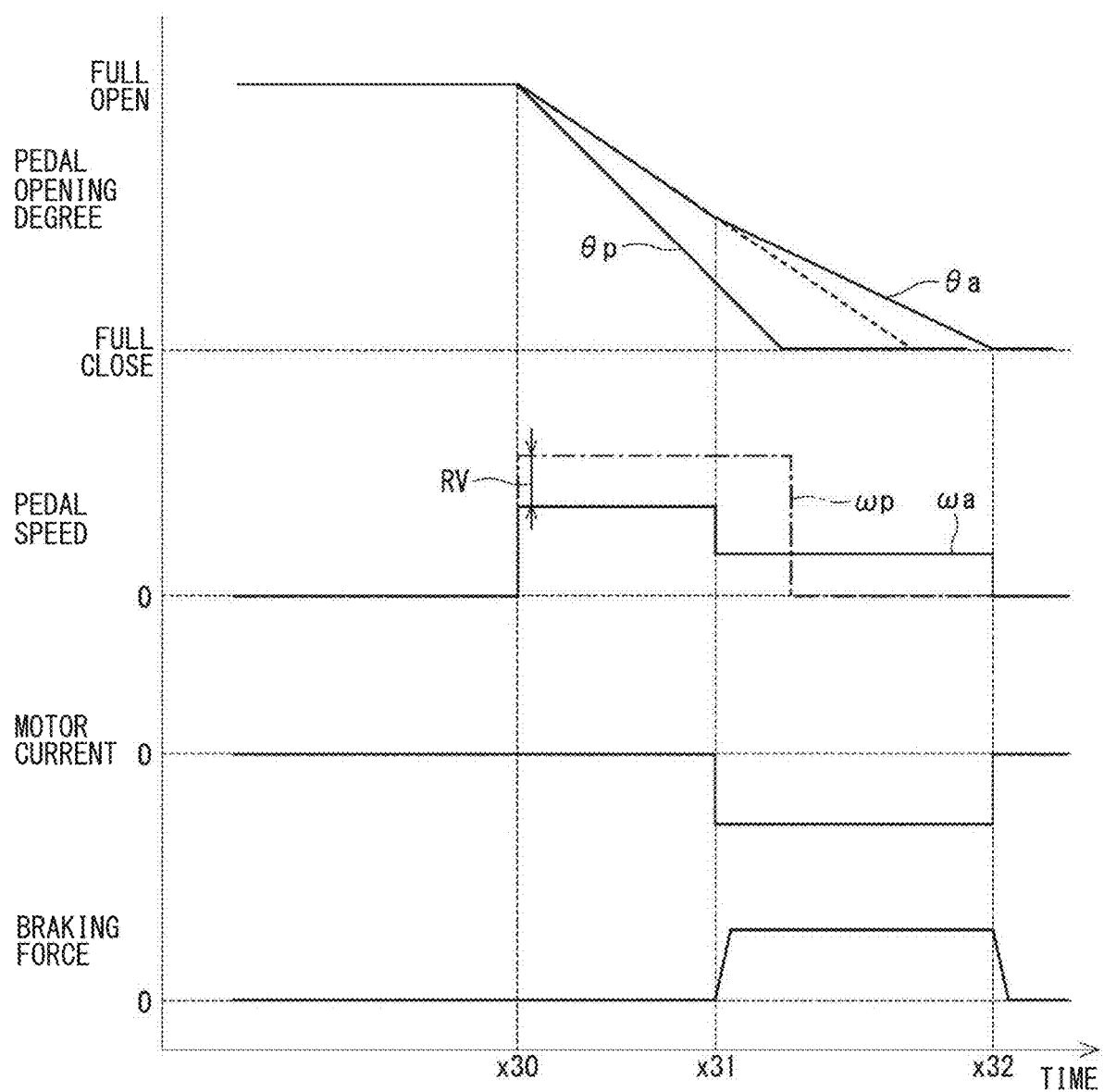
FIG. 15 is a time chart illustrating a brake control according to the third embodiment.

The brake control of the present embodiment will be explained based on the time chart of FIG. 15. In FIG. 15, the common time axis is used as the horizontal axis, and the pedal opening degree, the pedal speed, the motor current, and the braking force are shown from the top row. The same applies to FIG. 19, and the like.

The time before time x30 is the same as the time before time x10 in FIG. 11. At time x30, the pedal lever 20 begins to return. In this example, the angular speed ωp of the pedal lever 20 in the return direction is greater than the angular speed ωa of the actuator lever 45 in the return direction, and the relative speed RV is greater than or equal to the relative speed determination threshold value RVth.

The brake control is performed at time x31 when the relative speed RV remains at or above the relative speed determination threshold value RVth at least for the determination time. The details of the brake control are the same as in FIG. 11. At time x32, when the actuator lever 45 returns to the fully closed position, energization to the motor 31 is turned off and the brake control ends.

The control unit 60 performs the brake control when the relative speed RV of the pedal lever 20 with respect to the actuator lever 45 is greater than or equal to the relative speed determination threshold value RVth. Thereby, it is possible to more reliably determine whether to perform the brake control. The present embodiment also provides the same effects as the above-described embodiment.

Fourth Embodiment

Figure 16:
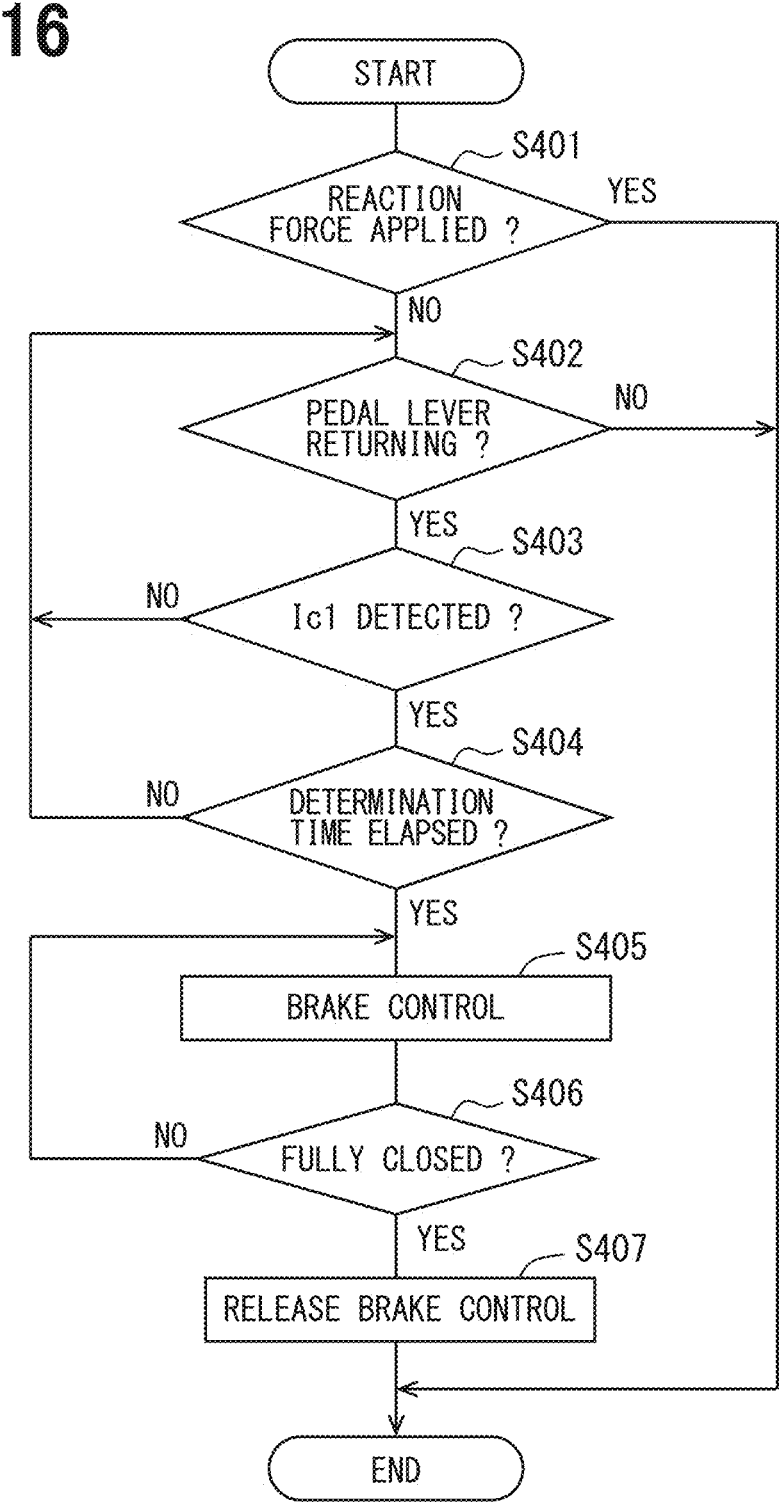
FIG. 16 is a flowchart illustrating a brake control according to a fourth embodiment.

A brake control process of the fourth embodiment will be explained based on a flowchart of FIG. 16. The processes in S401 and S402 are similar to the processes in S101 and S102 in FIG. 10.

In S403, the control unit 60 determines whether a back electromotive current Ic1 is detected. Here, even when no reaction force is being applied, the energization circuit is closed at least when the pedal is depressed. Further, since the back electromotive current Ic1 is a negative current flowing in a direction opposite to the reaction force applying direction, if the absolute value is greater than a current determination threshold value Ith1, an affirmative determination is made. If it is determined that the back electromotive current Ic1 is not detected (S403: NO), the process returns to S402.

If it is determined that the back electromotive current Ic1 has been detected (S403: YES), the process shifts to S404.

In S404, the control unit 60 determines whether a determination time has elapsed since the back electromotive current Ic1 was detected. If it is determined that the determination time has not elapsed (S404: NO), the process returns to S402. If it is determined that the determination time has passed (S404: YES), the process shifts to S405. The processing from S405 to S407 is similar to the processing from S104 to S106 in FIG. 10.

Figure 17:
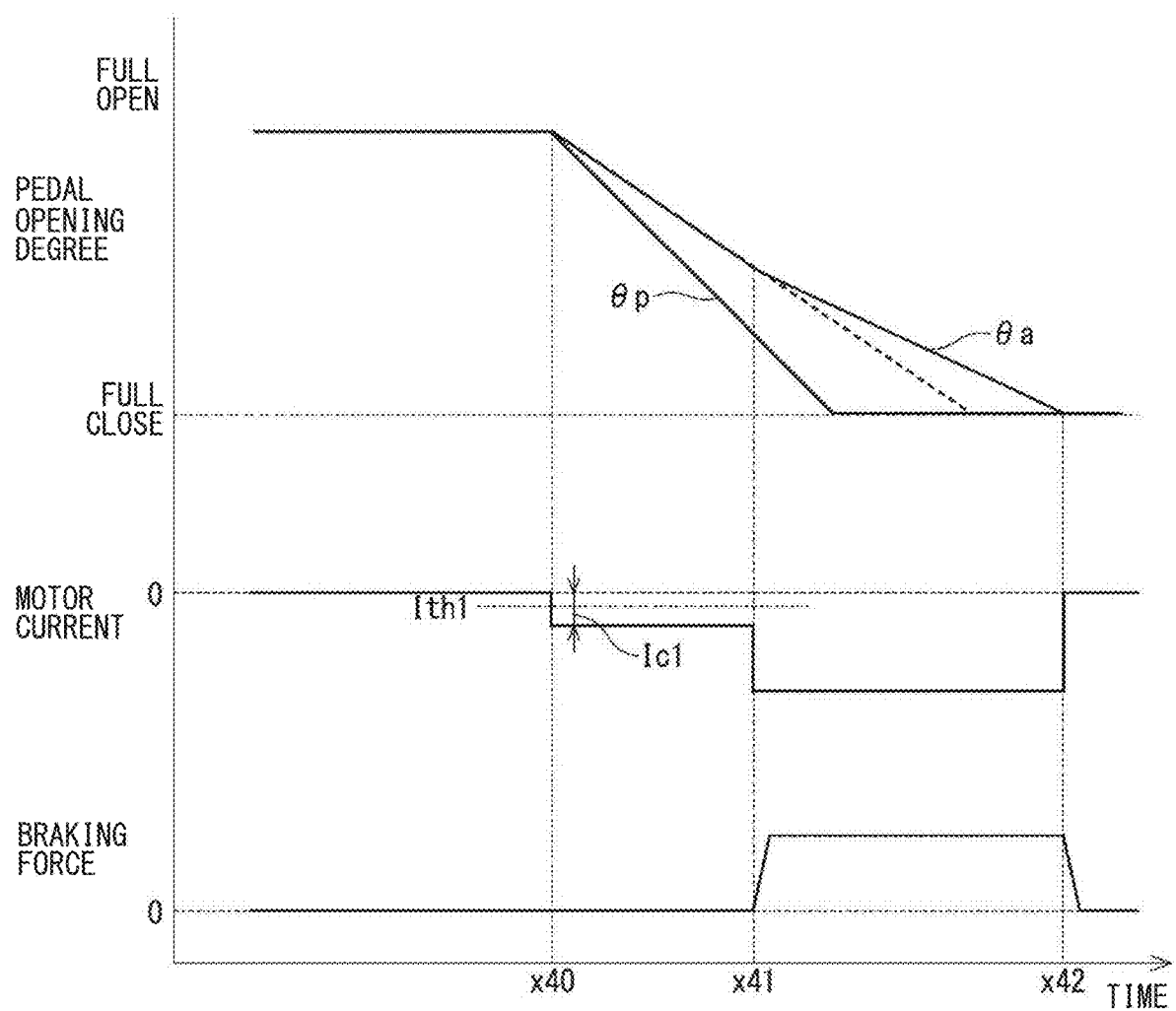
FIG. 17 is a time chart illustrating a brake control according to the fourth embodiment.

The brake control of the present embodiment will be explained based on a time chart of FIG. 17. Before time x40, a constant pedal opening degree is maintained in a state where no reaction force is applied by energizing the motor 31. It is assumed that the energization circuit at this time is in a closed state.

When the pedal lever 20 starts to return at time x40, the pedal lever 20 returns first, the actuator lever 45 follows behind, and the pedal lever 20 and the actuator lever 45 are separated. Here, since the energization circuit is a closed circuit, the motor 31 rotates as the actuator lever 45 rotates, thereby a back electromotive current Ic1 flows. In the present embodiment, a return state of the actuator lever 45 is detected by detecting the back electromotive current Ic1 using a current sensor or the like (not shown).

The brake control is performed at time x41 when the absolute value of the back electromotive current Ic1 continues to be equal to or greater than the current determination threshold value Ith1 for a determination time. The details of the brake control are the same as in FIG. 11. At time x42, when the actuator lever 45 returns to the fully closed position, energization to the motor 31 is turned off and the brake control ends.

The control unit 60 performs the brake control when the back electromotive current Ic1 is detected. Specifically, when the control unit 60 detects a back electromotive current due to the move of the actuator lever 45 in the return direction, it performs the brake control. The same effects as those of the above-described embodiments are obtainable even in such configuration.

Fifth Embodiment

Figure 18:
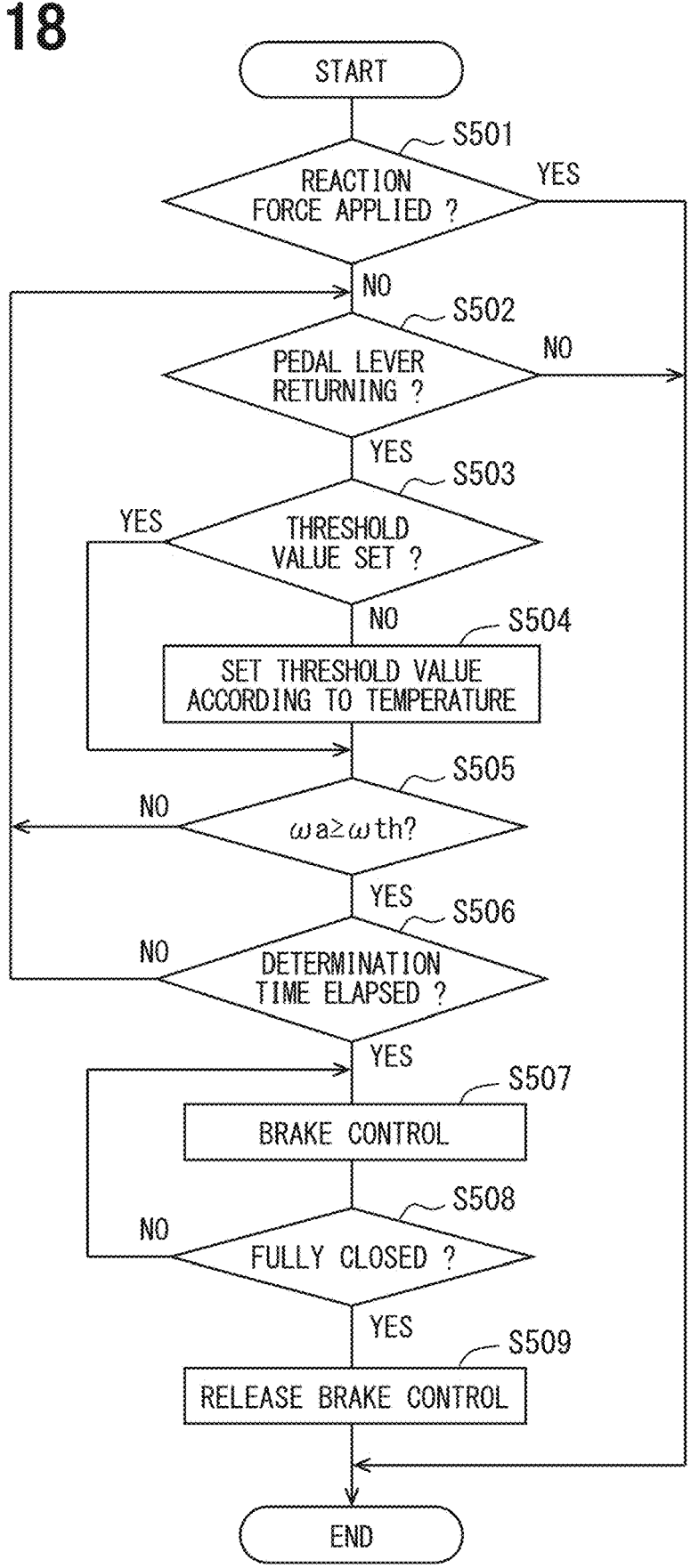
FIG. 18 is a flowchart illustrating a brake control according to a fifth embodiment.

A brake control according to the fifth embodiment will be explained based on a flowchart of FIG. 18. The processes in S501 and S502 are similar to the processes in S101 and S102 in FIG. 10.

In S503, a control unit 60 determines whether a threshold value has been set. If it is determined that the threshold value has been set (S503: YES), the process shifts to S505. If it is determined that the threshold value has not been set (S503: NO), the process shifts to S504.

In S504, the control unit 60 sets a speed determination threshold value ωth according to an actuator temperature. When the actuator temperature is high, the braking force decreases. Therefore, in the present embodiment, the speed determination threshold value ωth is set so that a brake control start timing becomes earlier as the temperature increases.

In S505, the control unit 60 determines whether an angular speed ωa of the actuator lever 45 in the return direction is greater than or equal to the speed determination threshold value ωth. Here, the determination is made based on the angular speed ωa of the actuator lever 45, but an angular speed ωp of the pedal lever 20 may also be used instead of the angular speed ωa of the actuator lever 45. If it is determined that the angular speed ωa is smaller than the speed determination threshold value ωth (S505: NO), the process returns to S502. If it is determined that the angular speed ωa is equal to or greater than the speed determination threshold value ωth (S505: YES), the process shifts to S506.

In S506, the control unit 60 determines whether a determination time has elapsed since the angular speed ωa became equal to or greater than the speed determination threshold value ωth. If it is determined that the determination time has not elapsed (S506: NO), the process returns to S502. If it is determined that the determination time has elapsed (S506: YES), the process shifts to S507. The processing from S507 to S509 is similar to the processing from S104 to S106 in FIG. 10.

Figure 19:
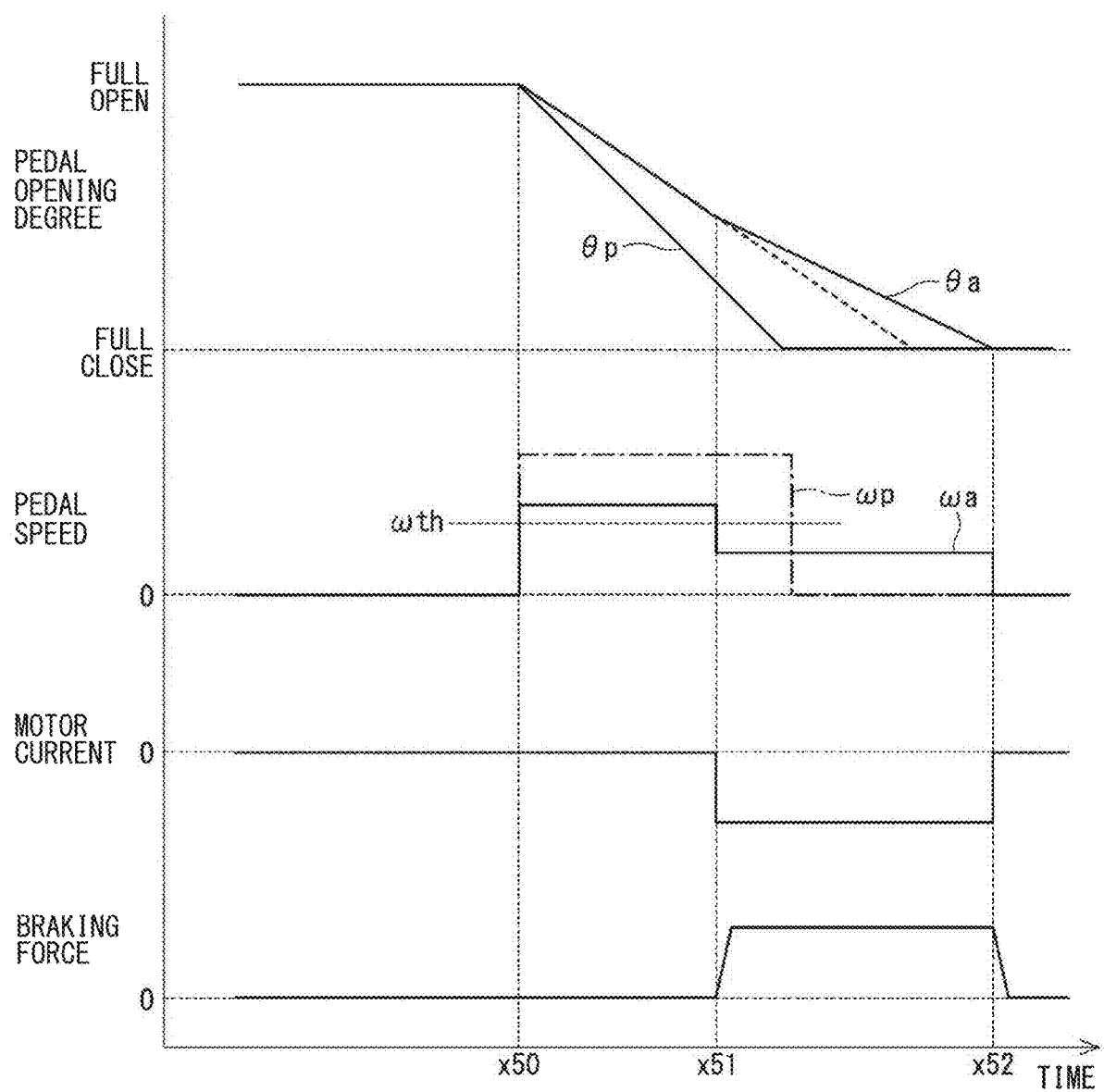
FIG. 19 is a time chart illustrating a brake control according to the fifth embodiment.

The brake control of the present embodiment will be explained based on the time chart of FIG. 19. The processing before time x50 is the same as the processing before time x10 in FIG. 11. At time x50, the pedal lever 20 begins to return, and the angular speed ωa becomes equal to or higher than the speed determination threshold value ωth.

The brake control is performed at time x51 when the state in which the angular speed ωa is equal to or greater than the speed determination threshold value ωth continues at least for a determination time. The details of the brake control are the same as in FIG. 11. At time x52, when the actuator lever 45 returns to the fully closed position, energization to the motor 31 is turned off and the brake control ends.

In the present embodiment, the brake control is performed when the angular speed of the pedal lever 20 or the actuator lever 45 in the return direction is equal to or higher than the speed determination threshold value ωth. Thereby, it is possible to reliably determine whether to perform the brake control. In addition, for example, when acquiring a detected value related to the pedal angle θp from another control unit via communication, the control is completed within the system by determining whether to perform the brake control based on the angular speed ωa, thereby a control logic can be simplified compared to a case in which the relative speed RV is used.

Further, the threshold value (in the present embodiment, the speed determination threshold value ωth) for determining the start of the brake control is variable depending on the actuator temperature. Specifically, the threshold value is changed so that the higher the actuator temperature becomes, the earlier the brake control start timing becomes. In such manner, an appropriate brake control is performable even at a high temperature time when the braking force decreases. The present embodiment also provides the same effects as the above-described embodiment.

Sixth Embodiment

In the sixth to eighth embodiments, a release of a brake control will mainly be explained. In the sixth to eighth embodiments, similar to the fifth embodiment, an example is shown in which the start of the brake control is determined using the angular speed ωa. However, the start determination of the brake control may be made similar to the first to fourth embodiments.

Figure 20:
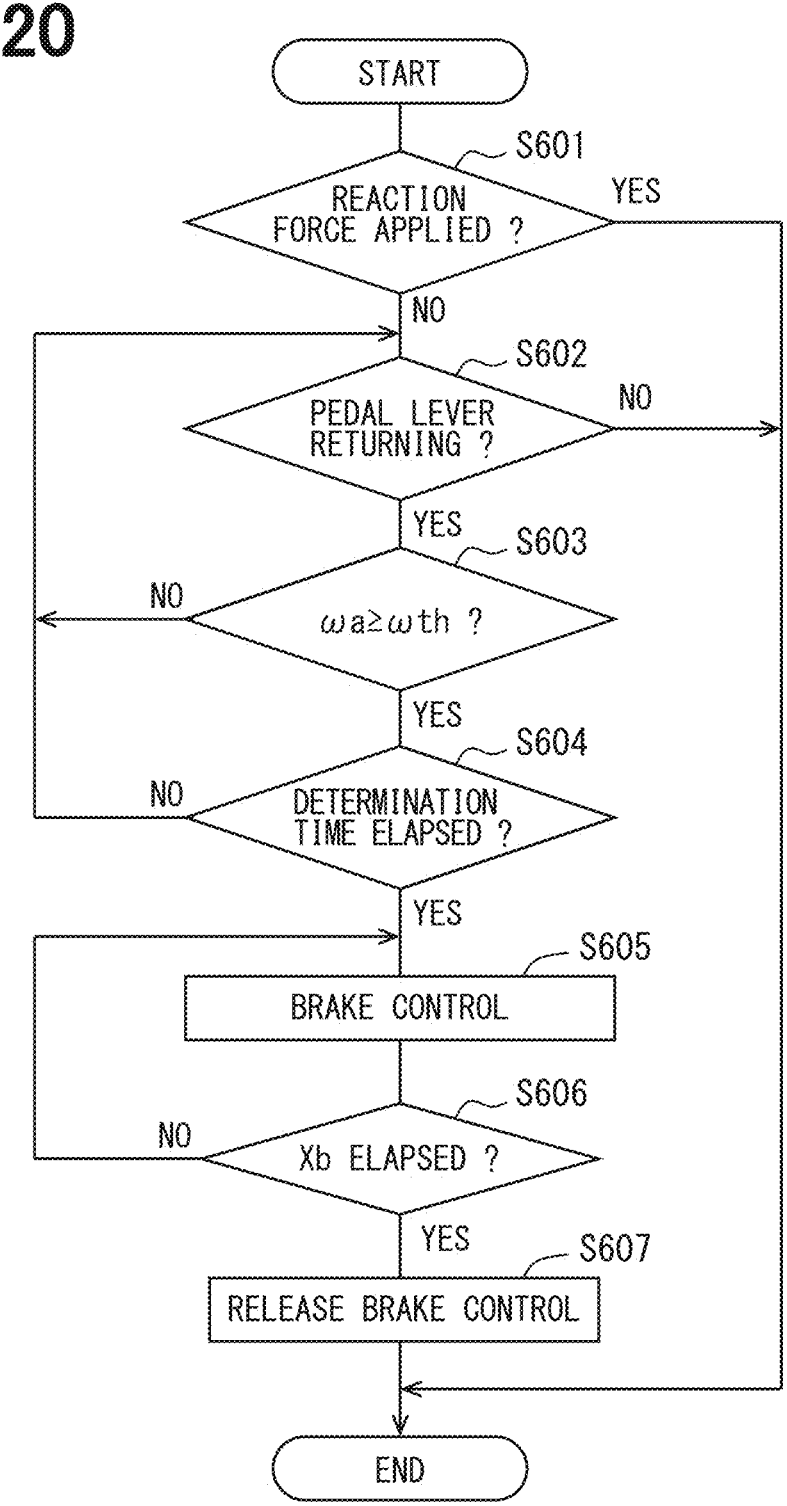
FIG. 20 is a flowchart illustrating a brake control according to a sixth embodiment.

The brake control process of the sixth embodiment will be explained based on a flowchart of FIG. 20. The processes in S601 and S602 are the same as the processes in S501 and S502 in FIG. 18, and the processes in S603 to S605 are the same as the processes in S505 to S507 in FIG. 18.

In S606, a control unit 60 determines whether the brake holding time Xb has elapsed since the start of the brake control. If it is determined that the brake holding time Xb has not elapsed since the start of the brake control (S606: NO), the process returns to S605 and the brake control is continued. If it is determined that the brake holding time Xb has elapsed since the start of the brake control (S606: YES), the process shifts to S607 and the brake control is released.

Figure 21:
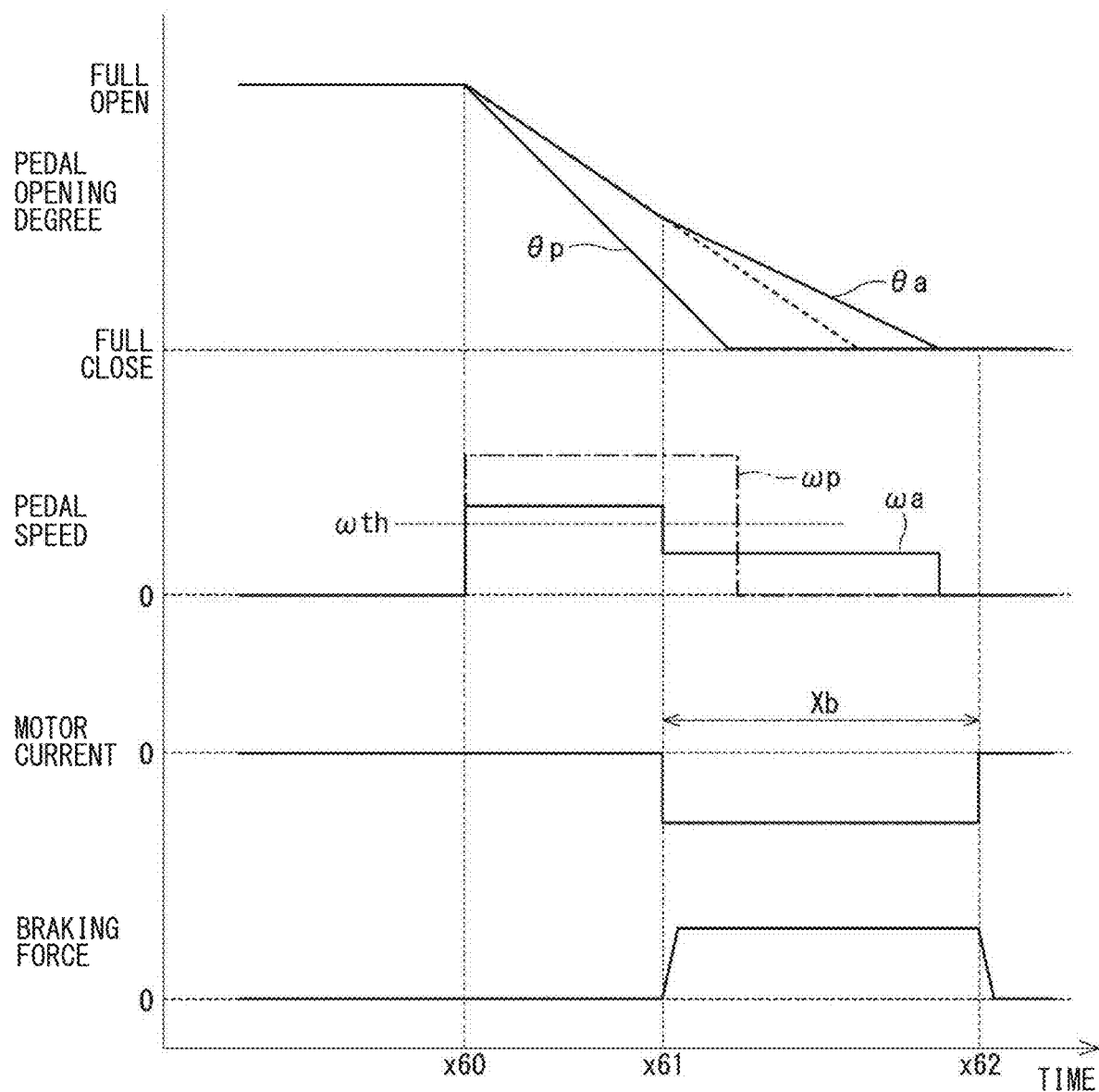
FIG. 21 is a time chart illustrating a brake control according to the sixth embodiment.

The brake control of the present embodiment will be explained based on a time chart of FIG. 21. The processing from time x60 to time x61 is similar to the processing from time x50 to time x51 in FIG. 19. In the present embodiment, at time x62 when the brake holding time Xb has elapsed from the start of the brake control, energization to the motor 31 is turned off and the brake control ends.

By continuing the brake control at least for the brake holding time Xb from the start of the brake control, the brake control is reliably performable. Further, in the example of FIG. 21, the actuator lever 45 returns to the fully closed position at a timing before time x62, and the brake control is released with the actuator lever 45 in the fully closed state. However, there is no problem even if the brake control is released in a state in which the brake lever 45 has not yet returned to the fully closed position. Thereby, even if the return speed of the actuator lever 45 is slow, the brake control is appropriately releasable.

In the present embodiment, the control unit 60 releases the brake control when the brake holding time Xb has elapsed since the start of the brake control. In such manner, the brake control is appropriately releasable, and the normal pedal force characteristics are restorable. The present embodiment also provides the same effects as the above-described embodiment.

Seventh Embodiment

Figure 22:
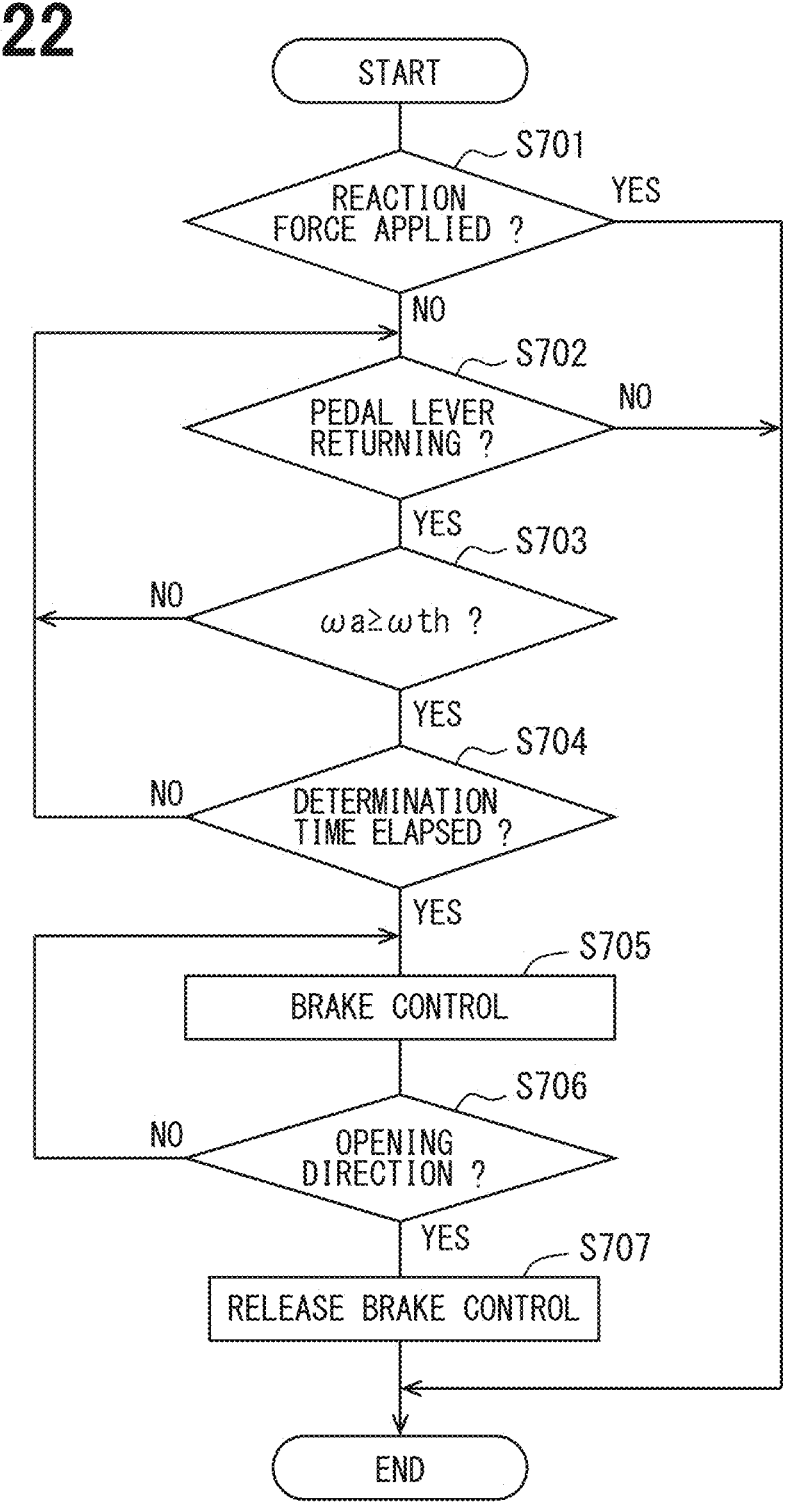
FIG. 22 is a flowchart illustrating a brake control according to a seventh embodiment.

Brake control process of the seventh embodiment will be explained based on a flowchart of FIG. 22. The processing from S701 to S705 is similar to the processing from S601 to S605 in FIG. 20. In S706, a control unit 60 determines whether the actuator lever 45 is moving in an opening direction based on an actuator angle θa. Instead of the actuator lever 45, it may be determined that the pedal lever 20 is moving in the opening direction based on a pedal angle θp. If it is determined that the actuator lever 45 is not moving in the opening direction (S706: NO), the process returns to S705 and the brake control is continued. If it is determined that the actuator lever 45 is moving in the opening direction (S706: YES), the process shifts to S707 and the brake control is released.

Figure 23:
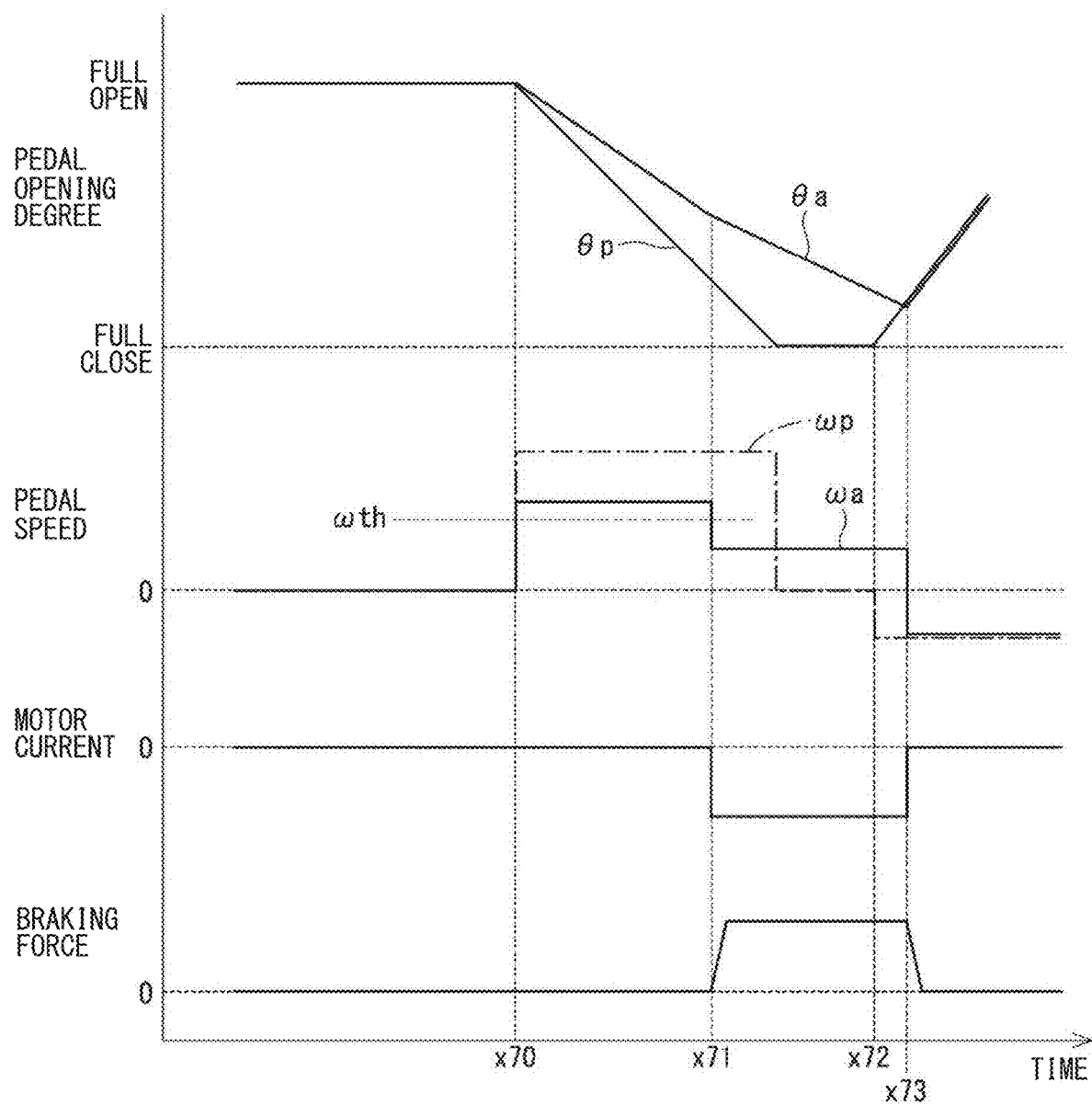
FIG. 23 is a time chart illustrating a brake control according to the seventh embodiment.

The brake control of the present embodiment will be explained based on a time chart of FIG. 23. The processing from time x70 to time x71 is similar to the processing from time x50 to time x51 in FIG. 19. When the pedal lever 20 is depressed at time x72, the pedal lever 20 independently moves in the opening direction while the pedal lever 20 and the actuator lever 45 are separated.

At time x73, when the pedal lever 20 and the actuator lever 45 come into contact with each other, the pedal lever 20 and the actuator lever 45 move together in the opening direction in response to the depression of the pedal lever 20. When the move of the actuator lever 45 in the opening direction is detected, energization to the motor 31 is turned off and the brake control ends.

In the present embodiment, the control unit 60 releases the brake control when detecting the move of the pedal lever 20 or the actuator lever 45 in the opening direction while performing the brake control. In such manner, the brake control is appropriately releasable and the normal pedal force characteristics are restorable, thereby suppressing deterioration of the driver's pedal operation feeling. Further, the present embodiment also provides the same effects as the above-described embodiment.

Eighth Embodiment

Figure 24:
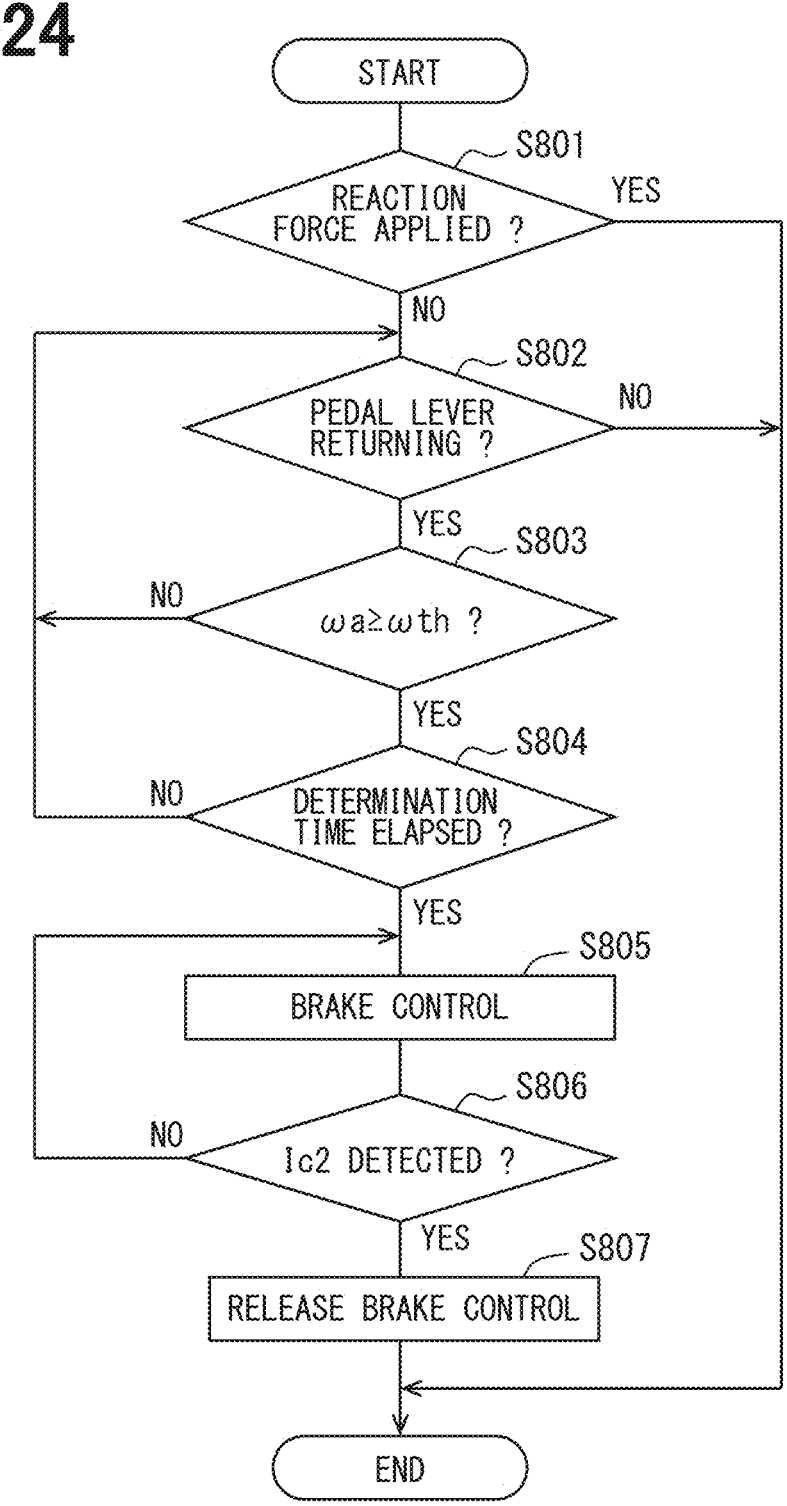
FIG. 24 is a flowchart illustrating a brake control according to an eighth embodiment.

Brake control process of the eighth embodiment will be explained based on a flowchart of FIG. 24. The processing from S801 to S805 is similar to the processing from S601 to S605 in FIG. 20. In S806, a control unit 60 determines whether or not a back electromotive current Ic2 at the time of depression is detected. The back electromotive current Ic2 at the time of depression is an electric current in the opposite direction to the brake current, that is, in the positive direction, and if it is greater than the current determination threshold value Ith2, an affirmative determination is made. If it is determined that the back electromotive current Ic2 is not detected (S806: NO), the process returns to S805 and the brake control is continued. If it is determined that the back electromotive current Ic2 has been detected (S806: YES), the process shifts to S807 and the brake control is released.

Figure 25:
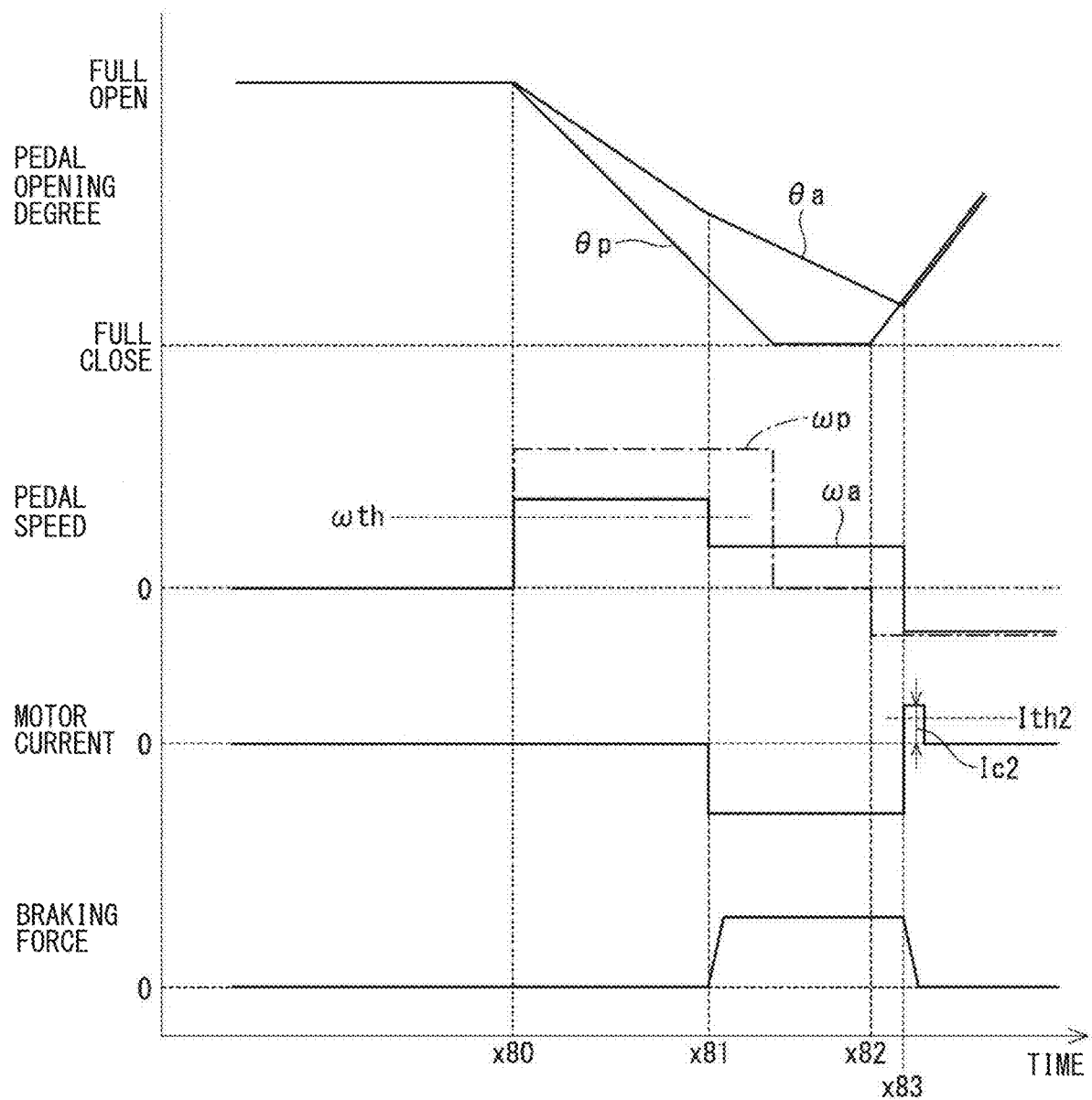
FIG. 25 is a time chart illustrating a brake control according to the eighth embodiment.

The brake control of the present embodiment will be explained based on the time chart of FIG. 25. The processing from time x80 to time x82 is the same as the processing from time x70 to time x72 in FIG. 23. The pedal lever 20 is depressed at time x82, and the pedal lever 20 and the actuator lever 45 are separated from each other until time x83.

At time x83, the pedal lever 20 and the actuator lever 45 come into contact, and when the actuator lever 45 is driven in the opening direction by pressing the pedal lever 20, the back electromotive current Ic2 flows in the opposite direction to the brake current. When the back electromotive current Ic2 is detected by a current sensor or the like, energization to the motor 31 is turned off and the brake control ends.

In the present embodiment, when the control unit 60 detects the back electromotive current Ic2 due to depression of the pedal lever 20 while performing the brake control, the control unit 60 releases the brake control. In such manner, the brake control is appropriately releasable and the normal pedal force characteristics are restorable, thereby suppressing deterioration of the driver's pedal operation feeling. Further, the present embodiment also provides the same effects as the above-described embodiment.

Other Embodiments

In the above-described embodiments, the position sensor for detecting the actuator angle is provided in the gear set that constitutes the power transmission mechanism. In other embodiments, the position sensor may be provided at any location that can be converted into an actuator angle, and the position sensor may be, for example, a motor rotation angle sensor that detects rotation of the motor. In other embodiments, either the accelerator opening sensor or the position sensor may be omitted.

In the above-described embodiments, the motor is a brushed DC motor. In other embodiments, the type of motor may be different. Further, the configuration, component arrangement, and the like of the motor driver and the power transmission mechanism may be different from those of the above-described embodiments.

In the first to fifth embodiments, detection of full close of the actuator lever, in the sixth embodiment, brake holding time from the start of the brake control, in the seventh embodiment, detection of depression of the pedal lever, and in the eighth embodiment, detection of the back electromotive current caused by depression of the pedal, causes release of the brake control. In other embodiments, for example, if full close or depression of the pedal is detected within the brake holding time, the brake control may be released, and if full close or depression of the pedal is not detected within the brake holding time, the brake control may be released after the lapse of the brake holding time. That is, release determination of the brake control may be performed by combining a plurality of embodiments.

In the fifth embodiment, the speed determination threshold value $\omega$th is set according to the actuator temperature. In other embodiments, the threshold value for determining the start of the brake control in embodiments other than the fifth embodiment may be set according to the actuator temperature. Specifically, the angle determination threshold value $\theta$th, the separation amount determination threshold value $\Delta\theta$th, the relative speed determination threshold value RVth, or the current determination threshold value Ith1 may be set according to the actuator temperature. That is, in other words, the angle determination threshold value $\theta$th, the separation amount determination threshold value $\Delta\theta$th, the relative speed determination threshold value RVth, the current determination threshold value Ith1, or the speed determination threshold value $\omega$th correspond to the "threshold value for determining the start of the brake control."

Further, the speed determination threshold value $\omega$th may be set to a predetermined value regardless of the actuator temperature. Furthermore, the actuator temperature, which is a parameter used to set the determination threshold value, is not limited to the temperature of the actuator itself, but may be the temperature of surrounding members or the ambient temperature.

The control unit and the method described in the present disclosure may be implemented by a dedicated computer provided by configuring a processor and a memory programmed to execute one or more functions embodied by a computer program. Alternatively, the control unit and the method described in the present disclosure may be implemented by a dedicated computer provided by configuring a processor with one or more dedicated hardware logic circuits. Alternatively, the control unit and the method described in the present disclosure may be implemented by one or more dedicated computers configured as a combination of (a) a processor and a memory programmed to perform one or more functions and (b) a processor including one or more hardware logic circuits. The computer programs may be stored, as instructions to be executed by a computer, in a tangible, non-transitory computer-readable medium. The present disclosure is not limited to the above-described embodiments, but various modifications may be made further within the scope of the present disclosure without departing from the spirit of the disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may also be made in the present disclosure.

What is claimed is:

1. An accelerator device comprising:
  a pedal lever movable in response to a depression operation and biased in a return direction by a pedal biasing member;
  a power transmission mechanism including an actuator lever that is contactable with the pedal lever and is biased in the return direction of the pedal lever by an actuator lever biasing member, and configured to be capable of applying a reaction force, which is a force in the return direction by a driving force of a drive source via the actuator lever, to the pedal lever; and a control unit configured to control energization of the drive source, wherein the control unit performs a brake control in which a return speed of the actuator lever is reduced, when the pedal lever returns to a fully closed direction; and the control unit is configured to release the brake control when the pedal lever or the actuator lever has returned to a fully closed position while performing the brake control.

2. The accelerator device according to claim 1, wherein the control unit is configured to energize the drive source in an opposite direction that is opposite to a direction of applying the reaction force in the brake control.

3. The accelerator device according to claim 1, wherein the control unit is configured to generate a regenerative braking force by closing an energization circuit related to the drive source, in the brake control.

4. The accelerator device according to claim 1, wherein the control unit determines whether to perform the brake control based on at least one of a pedal angle that is a rotation angle of the pedal lever, and an actuator angle that is a rotation angle of the actuator lever.

5. The accelerator device according to claim 4, wherein the control unit is configured to perform the brake control when the pedal angle or the actuator angle from a fully closed state of the pedal lever becomes less than or equal to an angle determination threshold value.

6. The accelerator device according to claim 4, wherein the control unit is configured to perform the brake control when an angular separation amount, which is a difference between the pedal angle and the actuator angle, is greater than or equal to a separation-amount determination threshold value.

7. The accelerator device according to claim 1, wherein the control unit is configured to perform the brake control when a relative speed of the pedal lever with respect to the actuator lever is equal to or higher than a relative-speed determination threshold value.

8. The accelerator device according to claim 1, wherein the control unit is configured to perform the brake control when an angular speed in the return direction of the pedal lever or the actuator lever is equal to or higher than a speed determination threshold value.

9. The accelerator device according to claim 1, wherein the control unit is configured to perform the brake control when detecting a back electromotive current due to a movement of the actuator lever in the return direction.

10. The accelerator device according to claim 1, wherein a threshold value for determining whether to start the brake control is variable according to an actuator temperature.

11. The accelerator device according to claim 1, wherein the control unit is configured to perform the brake control when the pedal lever returns in a state where no reaction force is being applied to the pedal lever.

12. An accelerator device comprising:
a pedal lever movable in response to a depression operation and biased in a return direction by a pedal biasing member;
a power transmission mechanism including an actuator lever that is contactable with the pedal lever and is biased in the return direction of the pedal lever by an actuator lever biasing member, and configured to be capable of applying a reaction force, which is a force in the return direction by a driving force of a drive source via the actuator lever, to the pedal lever; and
a control unit configured to control energization of the drive source, wherein
the control unit performs a brake control in which a return speed of the actuator lever is reduced, when the pedal lever returns to a fully closed direction; and
the control unit is configured to release the brake control when a brake holding time has elapsed after starting the brake control.

13. An accelerator device comprising:
a pedal lever movable in response to a depression operation and biased in a return direction by a pedal biasing member;
a power transmission mechanism including an actuator lever that is contactable with the pedal lever and is biased in the return direction of the pedal lever by an actuator lever biasing member, and configured to be capable of applying a reaction force, which is a force in the return direction by a driving force of a drive source via the actuator lever, to the pedal lever; and
a control unit configured to control energization of the drive source, wherein
the control unit performs a brake control in which a return speed of the actuator lever is reduced, when the pedal lever returns to a fully closed direction; and
the control unit is configured to release the brake control when detecting a movement of the pedal lever or the actuator lever in an opening direction during the brake control.

14. An accelerator device comprising:
a pedal lever movable in response to a depression operation and biased in a return direction by a pedal biasing member;
a power transmission mechanism including an actuator lever that is contactable with the pedal lever and is biased in the return direction of the pedal lever by an actuator lever biasing member, and configured to be capable of applying a reaction force, which is a force in the return direction by a driving force of a drive source via the actuator lever, to the pedal lever; and
a control unit configured to control energization of the drive source, wherein
the control unit performs a brake control in which a return speed of the actuator lever is reduced, when the pedal lever returns to a fully closed direction; and
the control unit is configured to release the brake control when detecting a back electromotive current due to depression of the pedal lever while during the brake control.

* * * * *